(12) United States Patent
Kishi et al.

(10) Patent No.: US 10,814,483 B2
(45) Date of Patent: *Oct. 27, 2020

(54) DATA CONVERSION APPARATUS, ROBOT, PROGRAM, AND INFORMATION PROCESSING METHOD

(71) Applicant: DENTSU INC., Tokyo (JP)

(72) Inventors: Yuki Kishi, Tokyo (JP); Yasuo Higa, Tokyo (JP); Akio Iijima, Tokyo (JP); Tatsuki Tatara, Tokyo (JP)

(73) Assignee: DENTSU GROUP INC., Tokyo (JP)

( * ) Notice: Subject to any disclaimer, the term of this patent is extended or adjusted under 35 U.S.C. 154(b) by 320 days.

This patent is subject to a terminal disclaimer.

(21) Appl. No.: 15/755,779

(22) PCT Filed: Oct. 27, 2016

(86) PCT No.: PCT/IB2016/056444
§ 371 (c)(1),
(2) Date: Feb. 27, 2018

(87) PCT Pub. No.: WO2017/037690
PCT Pub. Date: Mar. 9, 2017

(65) Prior Publication Data
US 2019/0022860 A1    Jan. 24, 2019

(30) Foreign Application Priority Data

Aug. 28, 2015 (JP) ................................ 2015-169735

(51) Int. Cl.
*G06T 13/40* (2011.01)
*B25J 9/16* (2006.01)
(Continued)

(52) U.S. Cl.
CPC ......... *B25J 9/1664* (2013.01); *B25J 11/0035* (2013.01); *G06T 13/205* (2013.01); *G06T 13/40* (2013.01)

(58) Field of Classification Search
CPC .... B25J 9/1664; B25J 11/0035; B06T 13/205; B06T 13/40; G09B 15/00; G09B 15/002;
(Continued)

(56) References Cited

U.S. PATENT DOCUMENTS 5,270,480 A * 12/1993 Hikawa ................. A63H 13/00
446/298
6,646,644 B1 * 11/2003 Suzuki ................. G10H 1/0008
345/473
(Continued)

FOREIGN PATENT DOCUMENTS

JP    2002-103258    4/2002
JP    2007-244726    9/2007
(Continued)

OTHER PUBLICATIONS

Plesnik et al., ECG signal acquisition and analysis for telemonitoring, 2010, IEEE, p. 1350-1355 (Year: 2010).*
(Continued)

*Primary Examiner* — McDieunel Marc
(74) *Attorney, Agent, or Firm* — Greenblum & Bernstein, P.L.C.

(57) ABSTRACT

To facilitate synchronization of a robot motion with a musical piece, a data conversion apparatus includes an acquisition unit configured to acquire first time-series information for designating coordinates of a constituent component of a predetermined computer graphics (CG) model on a beat basis in time series. The data conversion unit also includes a control unit configured to detect a structural difference between the predetermined CG model and a predetermined robot based on the first time-series information. The data conversion unit further includes a generation unit configured to correct the first time-series information based on the detected difference to generate second time-series information for designating coordinates of a constitu-
(Continued)

ent component of the predetermined robot on a beat basis in time series.

19 Claims, 19 Drawing Sheets

(51) Int. Cl.
   *B25J 11/00* (2006.01)
   *G06T 13/20* (2011.01)
(58) Field of Classification Search
   CPC .... G09B 15/0023; G10H 1/0008; G10H 1/40;
   A63H 13/00
   See application file for complete search history.

(56) References Cited

U.S. PATENT DOCUMENTS

| | | | |
|---|---|---|---|
| 7,099,747 B2 | 8/2006 | Mikami et al. | |
| 7,157,638 B1* | 1/2007 | Sitrick | G10H 1/0008 |
| | | | 84/477 R |
| 7,423,213 B2* | 9/2008 | Sitrick | G09B 15/023 |
| | | | 84/470 R |
| 10,410,392 B2* | 9/2019 | Kishi | G10H 1/40 |
| 2003/0023347 A1 | 1/2003 | Konno et al. | |
| 2003/0024375 A1* | 2/2003 | Sitrick | G09B 15/002 |
| | | | 84/477 R |
| 2003/0100965 A1* | 5/2003 | Sitrick | G09B 15/023 |
| | | | 700/83 |
| 2003/0110925 A1* | 6/2003 | Sitrick | G09B 15/002 |
| | | | 84/477 R |
| 2005/0125099 A1 | 6/2005 | Mikami et al. | |
| 2010/0011938 A1* | 1/2010 | Adams | G09B 15/00 |
| | | | 84/470 R |
| 2010/0290538 A1* | 11/2010 | Xu | G06T 13/205 |
| | | | 375/240.28 |
| 2018/0012389 A1* | 1/2018 | Kishi | G06T 13/40 |

FOREIGN PATENT DOCUMENTS

| | | |
|---|---|---|
| JP | 2008-030136 | 2/2008 |
| JP | 4592276 | 9/2010 |

OTHER PUBLICATIONS

Li et al., Intelligent algorithm for music playing robot—Applied to the anthropomorphic piano robot control, 2014, IEEE, p. 1538-1543 (Year: 2014).*
Kim et al, Enabling humanoid musical interaction and performance, 2011, IEEE, p. 212-215 (Year: 2011).*
Solis et al., The waseda flutist robot No. 4 refined IV: enhancing the sound clarity and the articulation between notes by improving the design of the lips and tonguing mechanisms, 2007, IEEE, gpl 2041-2046 (Year: 2007).*
Huang et al., Automatic Violin Player, 2012, IEEE, p. 3892-3897 (Year: 2012).*
International Search Report, dated Jan. 31, 2017 by the Japan Patent Office, in the corresponding International Application No. PCT/IB2016/056444.

* cited by examiner

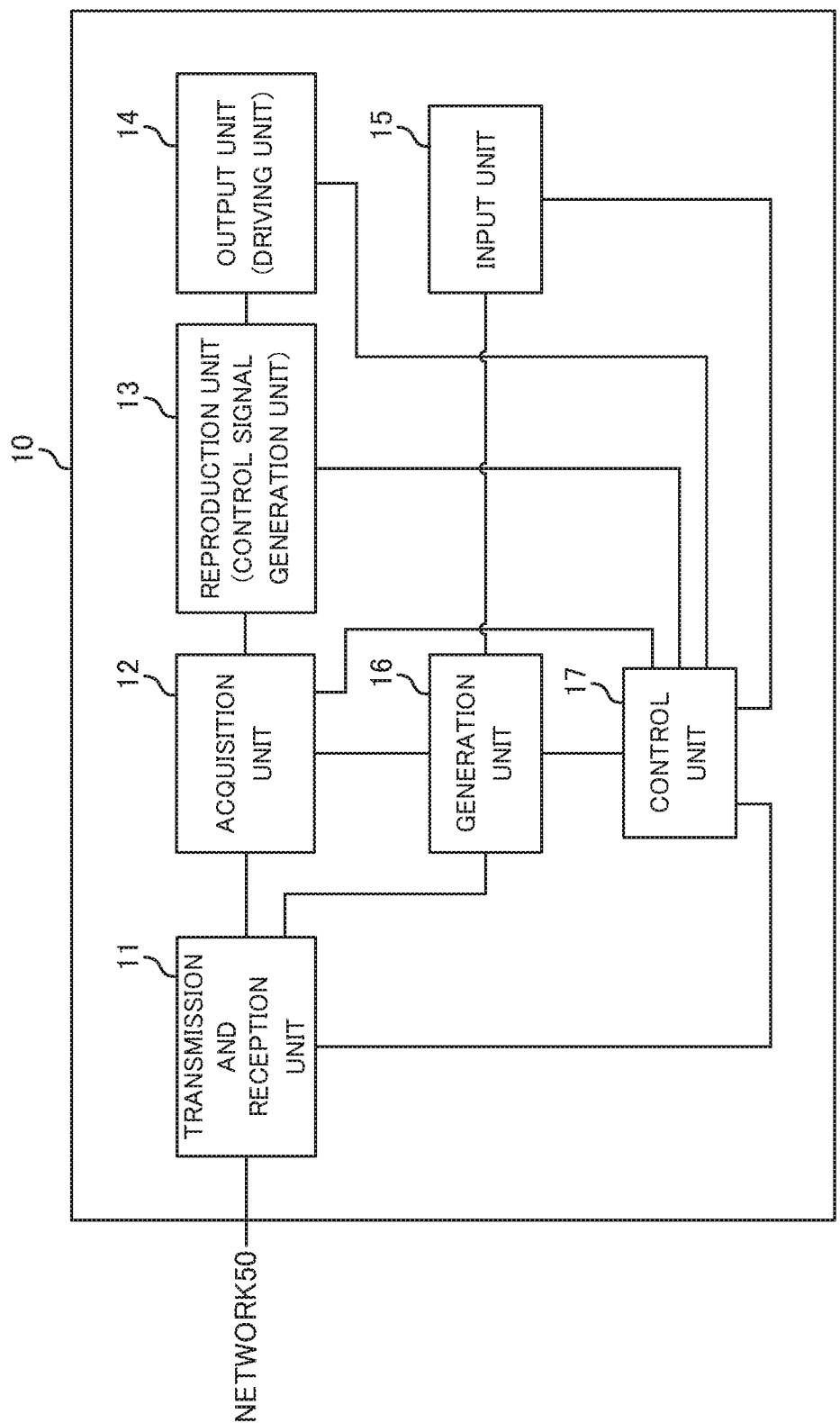

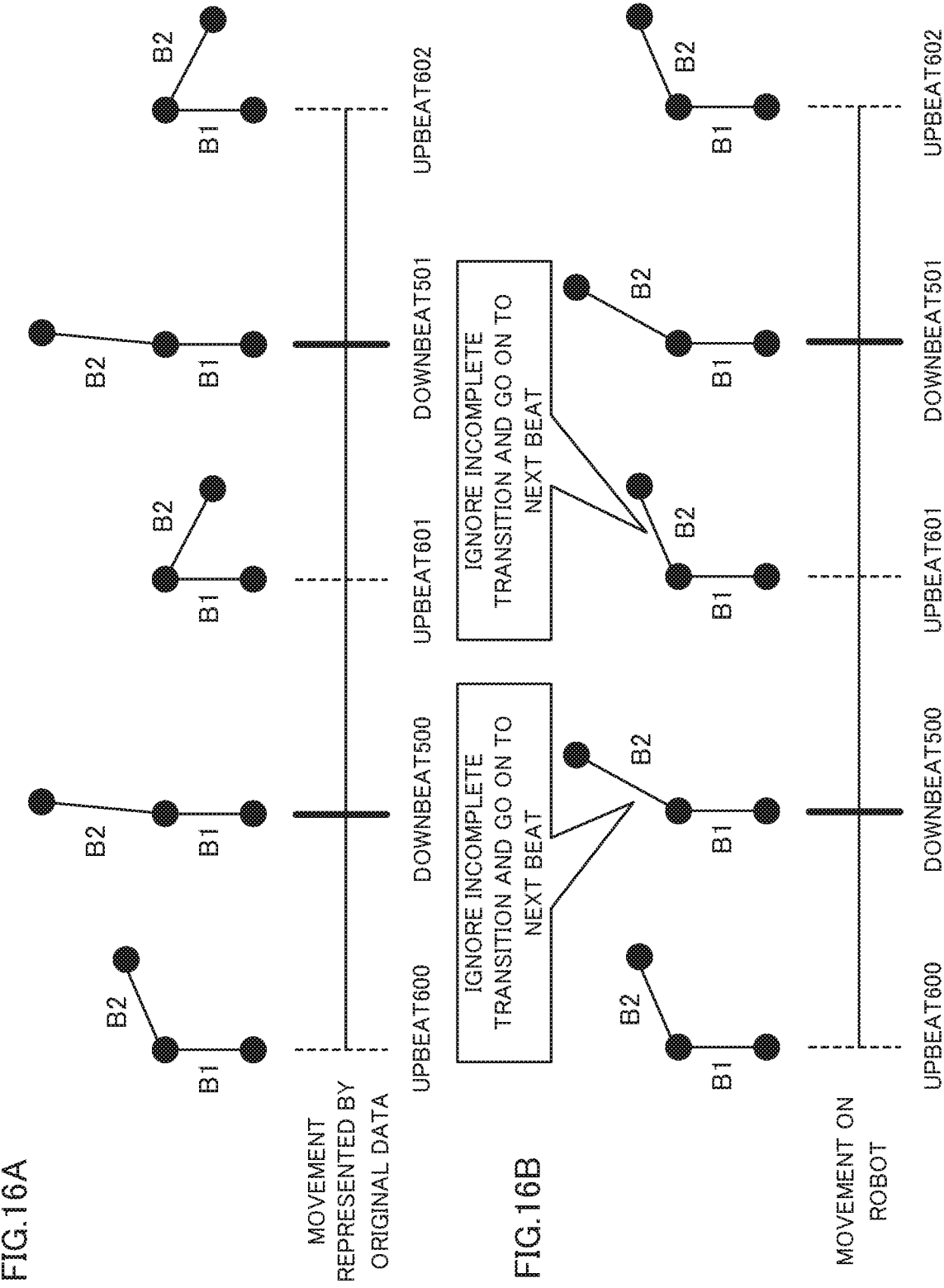

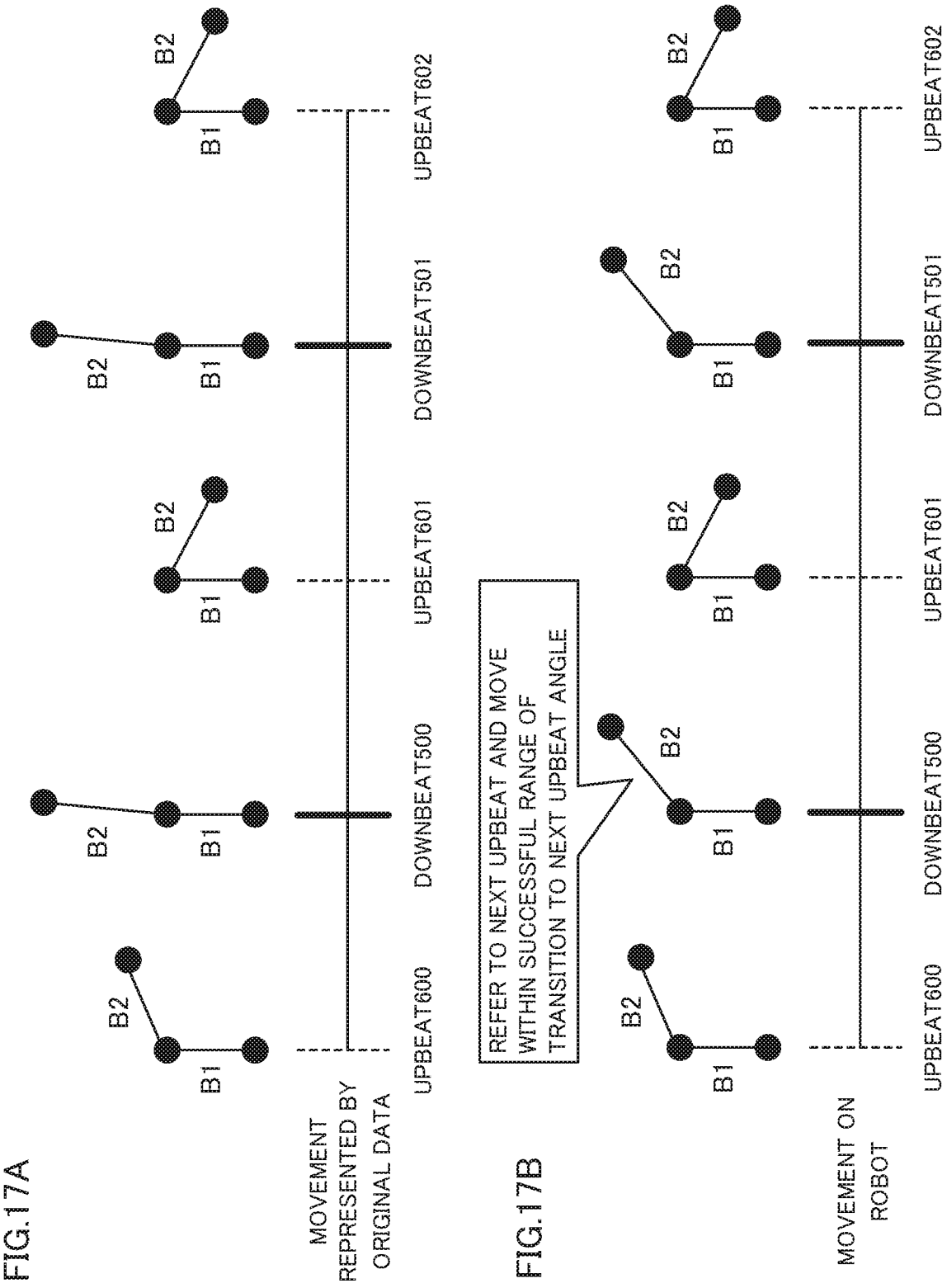

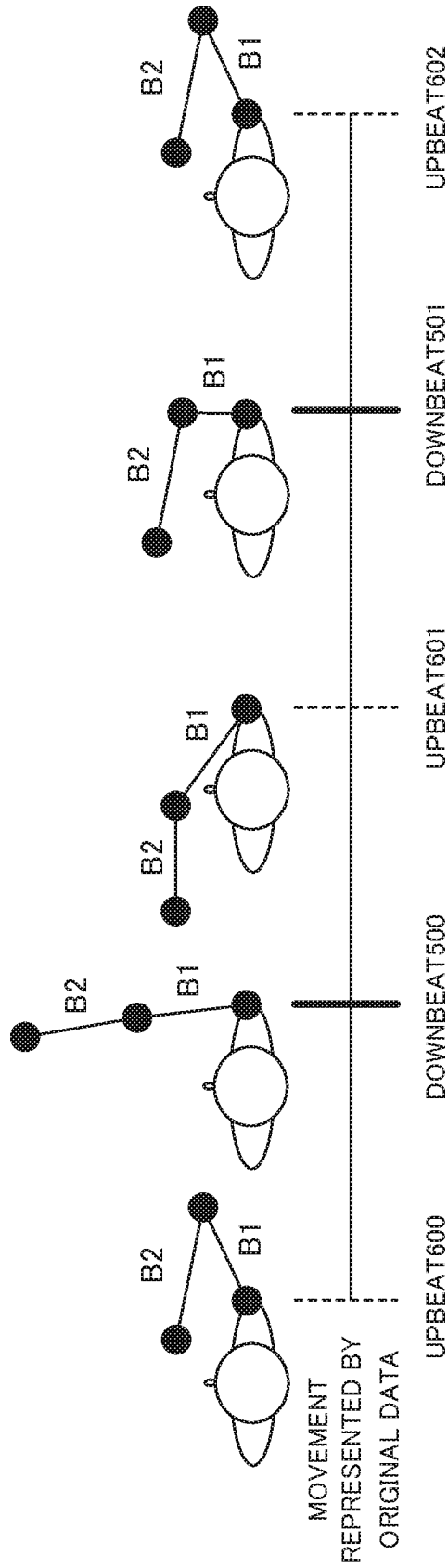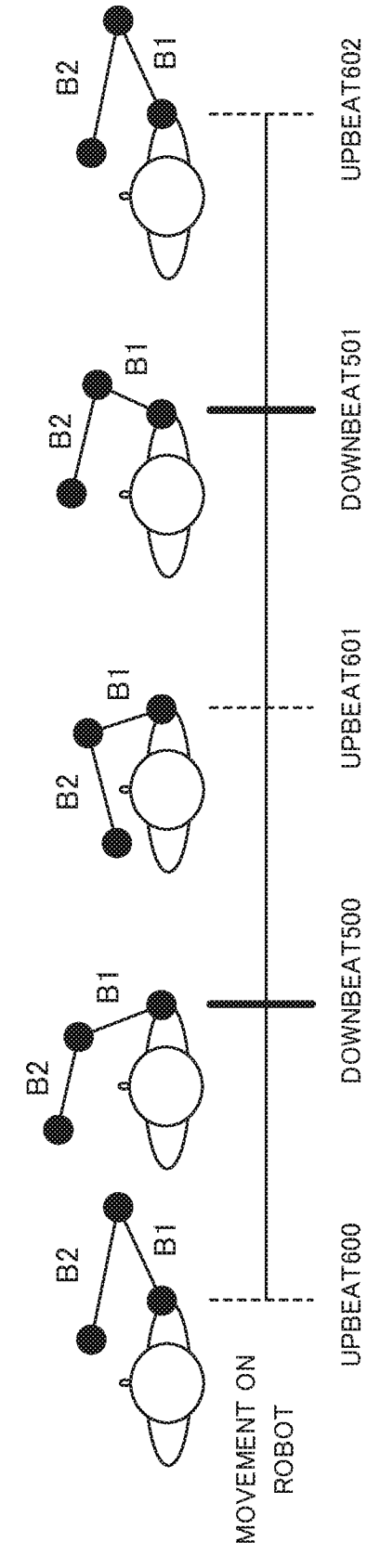

DATA CONVERSION APPARATUS, ROBOT, PROGRAM, AND INFORMATION PROCESSING METHOD

CROSS-REFERENCE TO RELATED APPLICATIONS

This application is based upon and claims the benefit of priority of the prior Japanese Patent Application No. 2015-169735, filed on Aug. 28, 2015, the entire contents of which are incorporated herein by reference.

TECHNICAL FIELD

The present invention relates to a motion control of a robot.

BACKGROUND ART

In recent years, introduction of robots is increasing not only in industrial fields but also in medical, service, and other fields as well as in ordinary homes. Since present-day robots have highly advanced information processing capabilities, there are software methods for controlling robot motions (see, for example, patent literature 1). Such a method enables a robot to realize a desired motion, for example, by causing the robot to execute a program for performing an operation (e.g., dance) as considered by a choreographer or a designer.

CITATION LIST

Patent Literature

Patent Literature 1: Japanese Patent Publication No. 4592276

SUMMARY OF INVENTION

Technical Problem

Operation programming in the conventional robot control requires designers to input information about positions and speeds (such as joint angles and angular speeds) at respective control points (joints or the like) of the robot. However, for example, when creating a motion for a robot to dance according to a musical piece, delicate adjustments to synchronize the movement with the musical piece are required and complicate the creation of the motion.

In view of the above-mentioned problems, the present invention intends to provide a data conversion device, a robot, a program, and an information processing method capable of facilitating synchronization of a robot motion with a musical piece.

Solution to Problem

A data conversion apparatus according to one aspect of the present invention includes an acquisition unit configured to acquire first time-series information for designating coordinates of a constituent component of a predetermined computer graphics (CG) model on a beat basis in time series, a control unit configured to detect a structural difference between the predetermined CG model and a predetermined robot based on the first time-series information, and a generation unit configured to generate second time-series information for designating coordinates of a constituent component of the predetermined robot on a beat basis in time series, by correcting the first time-series information based on the detected difference.

Advantageous Effects of Invention

According to the present invention, synchronizing a robot motion with a musical piece is feasible easily.

BRIEF DESCRIPTION OF DRAWINGS

FIG. 3 illustrates an exemplary functional configuration of the robot according to an embodiment of the present invention.

FIGS. 16A and 16B illustrate exemplary limitation with respect to speed according to an embodiment of the present invention.

FIGS. 17A and 17B illustrate another exemplary limitation with respect to speed according to an embodiment of the present invention.

FIGS. 18A and 18B illustrate further another exemplary limitation with respect to speed according to an embodiment of the present invention.

DESCRIPTION OF EMBODIMENTS

The inventors of the present invention, in studying a data structure suitable for a robot movement control, have focused on three-dimensional computer graphics (3DCG), which may be simply referred to as computer graphics (CG). In 3DCG, various data structures have been proposed to represent CG characters (CG models). There are conventionally proposed data structures suitable for specific characters having complicated skeleton structures, such as human beings (for example, as discussed in Japanese Patent No. 3337938 and Japanese Patent No. 3380158). Using these CG models and data structures is useful to create moving images for a CG animation.

First, the inventors have conducted inventive studies on data structure of movement data (motion data) of a CG model that can be easily synchronized with sound data (e.g., music data, voice data, etc.). Then, the inventors have conceived to generate robot motions by using motions of the CG model generated according to the studied data structure. Also, in this case, the inventors have found a method for correcting the motions considering differences between the CG model and the robot. According to this method, the robot motions can be easily synchronized with the sound data. In addition, because the data structure is common to the CG model, developing new services such as synchronization control for the CG animation and the robot becomes feasible.

More specifically, the data structure according to one aspect of the present invention enables to constitute motion data of a CG model on a beat basis, in which the length of actual time changes according to the tempo, not on a frame (a still image constituting a CG moving image) basis or not on a real time basis. Using such a data structure can control a robot motion on a beat basis.

The above-mentioned data structure according to one aspect of the present invention may be referred to as a choreography data format, choreo-data format or the like. In addition, data expressed by the choreography data format, data conforming to the choreography data format (including, for example, frame-by-frame basis time-series data convertible into the choreography data format), and other data compatible with the choreography data format may be referred to as choreography data or dance choreography data.

Embodiments of the present invention will be described in detail below with reference to attached drawings.

Information Processing System

Figure 1:
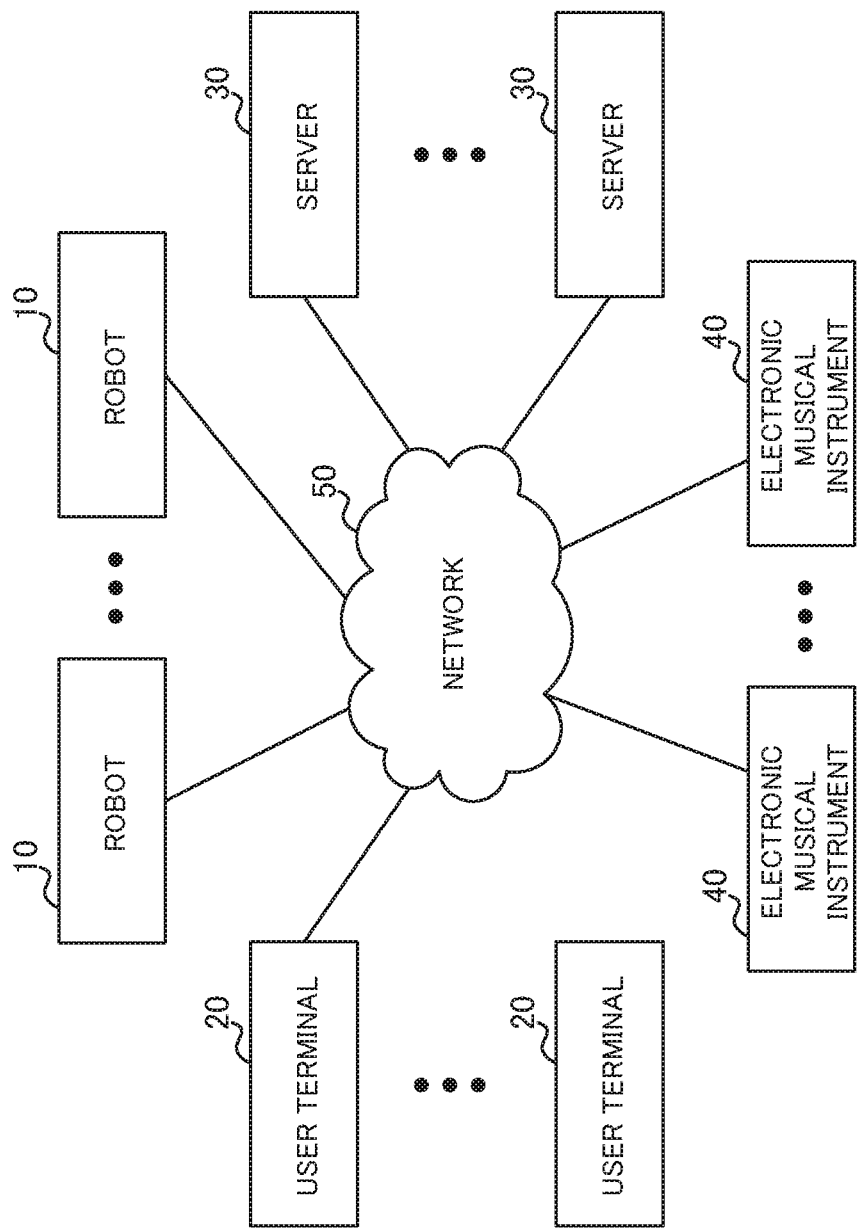
FIG. 1 illustrates an exemplary schematic configuration of an information processing system according to an embodiment of the present invention.

First, an information processing system according to the present invention will be described. FIG. 1 illustrates a schematic configuration of an exemplary information processing system according to an embodiment of the present invention. The information processing system 1 illustrated in FIG. 1 includes a robot 10, a user terminal 20, a server 30, an electronic musical instrument 40, and a network 50.

The robot 10 is assumed to possess relatively highly-advanced information processing capabilities and is comparable, in this respect, to PEPPER (registered trademark) by Aldebaran Robotics Corporation or ASIMO (registered trademark) by Honda Motor Co., Ltd., although it is not limited to these examples. The structure and functional blocks of the robot 10 will be described in detail below with reference to FIGS. 2A, 2B, and 3.

The user terminal 20 can be a portable terminal (a mobile communication terminal), such as a portable telephone, a smartphone, or a tablet-type device, or can be a fixed communication terminal, such as a personal computer, a multifunctional television, a set-top box (e.g., Apple TV (registered trademark), Chromecast (registered trademark), or the like).

The server 30 is an apparatus functionally capable of transmitting and/or receiving choreography data to/from the robot 10, the user terminal 20 and/or the electronic musical instrument 40. The transmission and reception of the choreography data can be performed periodically or can be performed at predetermined timing in response to a request from the robot 10, the user terminal 20 and/or the electronic musical instrument 40. Further, the server 30 can transmit and receive the data generated by using choreography data (e.g., moving image or the like) to and from the robot 10, the user terminal 20 and/or the electronic musical instrument 40.

The electronic musical instrument 40 is an apparatus functionally capable of generating sounds corresponding to performance information, such as Musical Instrument Digital Interface (MIDI) data. For example, the electronic musical instrument 40 is an electronic piano or a synthesizer, although it is not limited to these examples.

The network 50 connects a plurality of devices to enable communications of information. For example, the network 50 includes various networks including the Internet, a mobile network, a local area network (LAN), and a wide area network (WAN) and the like. The network 50 can be arranged as a wireless network or a wired network.

The illustrated system configuration is merely an example and the present invention is not limited to this example. Although the system illustrated in FIG. 1 includes a plurality of robots 10, user terminals 20, servers 30, and electronic musical instruments 40, the number of respective devices is not limited to the illustrated example. In addition, the information processing system 1 may be configured not to include a part of the robots 10, the user terminals 20, the servers 30, and the electronic musical instruments 40. In addition, even when the robot 10 is not connected to the network 50, the robot 10 may input and output choreography data via a predetermined storage medium, which is connected, or may acquire choreography data via a built-in storage device.

Figure 2A:
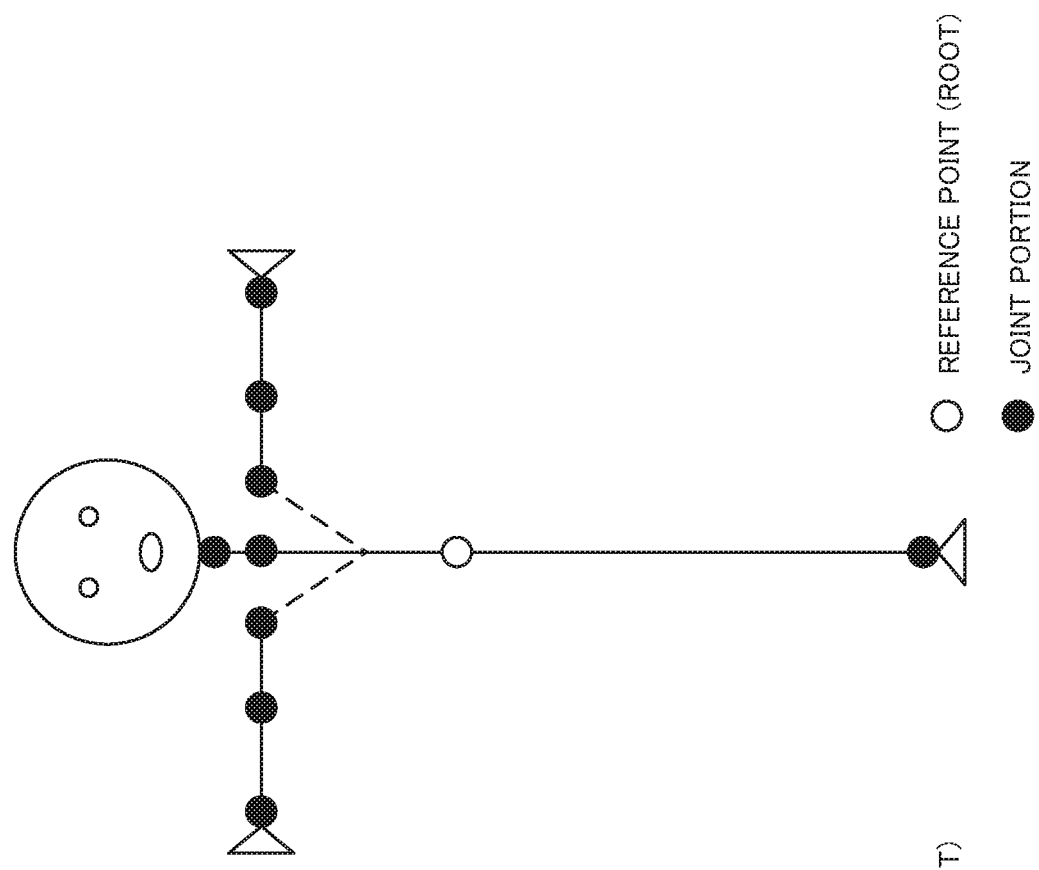
FIGS. 2A and 2B schematically illustrate an exemplary robot according to an embodiment of the present invention.
Figure 2B:
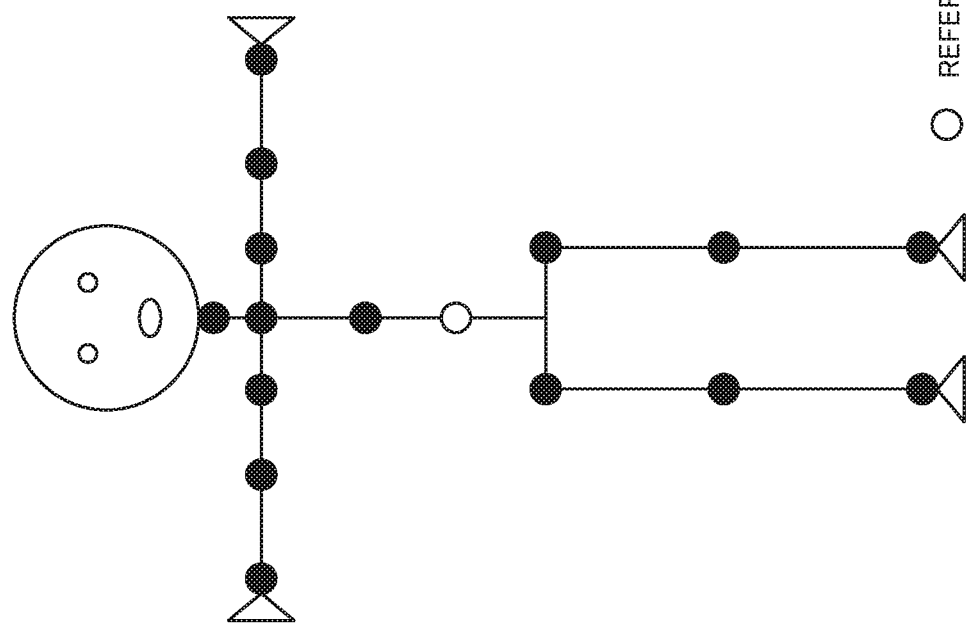

FIGS. 2A and 2B schematically illustrate examples of a robot according to an embodiment of the present invention. FIGS. 2A and 2B mainly illustrate joint portions constituting a skeleton structure. The robot illustrated in each of FIGS. 2A and 2B has a plurality of joint portions. FIG. 2A illustrates a humanoid robot that can perform bipedal walking. FIG. 2B illustrates a simplified configuration of the robot illustrated in FIG. 2A, in which some of the joint portions are omitted compared to FIG. 2A.

The robot illustrated in FIG. 2B has no clavicle and has the shoulder is independent of a trunk. In addition, a single line is used to express each of the spine and the leg bone. The robot illustrated in FIG. 2B has a shape integrating a leg part and a trunk part, and may be configured as a self-propelled robot if wheels (e.g., Omni wheels) or caterpillars are provided at a tip of the leg part.

Some of the joint portions may be fixed, as a reference point (a root), inside the robot. For example, in FIGS. 2A and 2B, the reference point is set as the joint portion positioned corresponding to a waist.

Roll/pitch/yaw axes, which are explained based on common recognition in the technical field of the present invention, can constitute respective joint portions. For example, the robot illustrated in FIGS. 2A and 2B can be configured to have degree of freedom in two axes (roll/pitch) on the shoulder, two axes (roll/yaw) on the elbow, and one axis (yaw) on the wrist. In addition, the robot may have a head, fingers, and feet that can be driven. The number of the joint portions and the degree of freedom at each joint portion are not limited to the configurations illustrated in FIGS. 2A and 2B.

FIG. 3 illustrates an exemplary functional configuration of the robot according to an embodiment of the present invention. As illustrated in FIG. 3, the robot 10 has a transmission and reception unit 11, an acquisition unit 12, a reproduction unit (a control signal generation unit) 13, an output unit (a driving unit) 14, an input unit 15, a generation unit 16, and a control unit 17. The robot 10 can constitute a data conversion apparatus, which serves as an information processing apparatus according to the present invention. In addition, the robot 10 can realize an information processing method according to one aspect of the present invention, and can execute steps of performing information processing using choreography data.

Although mainly illustrated in FIG. 3 are functional blocks of characteristic features according to the present embodiment, the robot 10 can include additional functional blocks for other processing.

The transmission and reception unit 11 can transmit and receive choreography data and necessary information to and from another robot 10, the user terminal 20, the server 30, or the electronic musical instrument 40 via the network 50. The transmission and reception unit 11 can output the received choreography data to the acquisition unit 12. In addition, the transmission and reception unit 11 may output received predetermined data (e.g., motion data of a CG model) to the generation unit 16. In addition, the transmission and reception unit 11 can output various received information to the control unit 17. A transmitter/receiver, a transmission and reception circuit, or a transmission and reception apparatus, which are explained based on common recognition in the technical field of the present invention, can constitute the transmission and reception unit 11. Alternatively, a transmission unit and a reception unit may constitute the transmission and reception unit 11.

The acquisition unit 12 can acquire choreography data from the transmission and reception unit 11 and/or the generation unit 16. The acquisition unit 12 can output the acquired choreography data to the transmission and reception unit 11 and/or the reproduction unit 13.

The reproduction unit (the control signal generation unit) 13 can reproduce data entered from the acquisition unit 12 and output the reproduced data to the output unit 14. For example, the reproduction unit (the control signal generation unit) 13 interprets choreography data modified by the generation unit 16 to generate a signal (control signal) controlling a motion of the robot (e.g., a motion of a joint portion), and outputs the control signal to the output unit 14.

In addition, the reproduction unit (the control signal generation unit) 13 may interpret choreography data for a CG model based on an instruction (for example, including information about structural differences between the CG model and the robot 10) from the control unit 17 and may generate a signal (control signal) controlling a motion that the robot can realize, considering structural and operational limitations of the robot 10 (such as angular and moving speed limitations of each joint point), and may output the control signal to the output unit 14. A signal generator, a signal generation circuit, or a signal generation apparatus, which are explained based on common recognition in the technical field of the present invention, can constitute a part of the reproduction unit (the control signal generation unit) 13.

In addition, the reproduction unit 13 may be configured to reproduce predetermined contents (e.g., sound data of a musical piece, voice, and so on) and output the reproduced contents to the output unit 14. For example, the reproduction unit 13 converts sound related contents into a reproduction signal that the output unit 14 can recognize according to a sound file format relating to the contents. A player, an image/video/sound processing circuit, an image/video/sound processing apparatus, or an amplifier, which are explained based on common recognition in the technical field of the present invention, can constitute a part of the reproduction unit 13.

The output unit (the driving unit) 14 can drive a plurality of joint portions based on a control signal entered from the reproduction unit 13 to realize a required motion of the robot 10. More specifically, a part of the output unit 14 constitutes a joint portion of the robot 10. Each joint portion can be configured to include a motor capable of performing a rotational operation around a predetermined axis based on a control signal, an encoder capable of detecting the rotational position of the motor, and a driver capable of controlling the rotational position and the speed of the motor based on an output of the encoder. However, the output unit (the driving unit) 14 is not limited to the above-mentioned configuration. An actuator, a driving circuit, or a driving apparatus, which are explained based on common recognition in the technical field of the present invention, can constitute the output unit (the driving unit) 14.

In addition, the output unit 14 can output a reproduction signal of contents entered from the reproduction unit 13. For example, a display unit displaying visual data (e.g., a CG moving image) and a sound output unit outputting sound data may constitute a part of the output unit 14. A display apparatus such as a monitor or a display device which are explained based on common recognition in the technical field of the present invention, can constitute the display unit. In addition, a speaker or a comparable output device, which are explained based on common recognition in the technical field of the present invention, can constitute the sound output unit.

The input unit 15 can acquire information about external environment. For example, the input unit 15 can be arranged to partly include at least one or a combination of a camera acquiring still images and/or moving images, a microphone acquiring sounds, and various sensors (a touch sensor, a ground sensor, an acceleration sensor, a tilt sensor, a gyroscope, a temperature sensor (thermography), an ultrasonic sensor, a geodetic sensor (a laser scanning sensor), a radio beam (radar), and the like).

In addition, the input unit 15 may be configured to receive an instruction to the robot 10 entered in response to a user's operation and output the input result to the control unit 17. An input device such as a keyboard or a mouse, which are explained based on common recognition in the technical field of the present invention, can constitute a part of the input unit 15. In addition, a part of the input unit 15 may have a configuration integrated with the display unit (e.g. touch panel).

In addition, the input unit 15 may be connected to a predetermined device or storage medium to receive an input of data, so that the input result can be output to the control unit 17 or the generation unit 16. In this case, input and output terminals or input and output circuits, which are explained based on common recognition in the technical field of the present invention, can constitute a part of the input unit 15.

The generation unit 16 can generate choreography data by using data entered from the transmission and reception unit 11 and the input unit 15 via the acquisition unit 12. The generation unit 16 may correct choreography data for the CG model based on an instruction (for example, including information about structural differences between the CG model and the robot 10) from the control unit 17 and generate choreography data for the robot 10 (convert the choreography data). The generation unit 16 may output the generated choreography data to the transmission and reception unit 11, the acquisition unit 12, or the reproduction unit 13. An arithmetic unit, an arithmetic circuit, or an arithmetic apparatus, which are explained based on common recognition in the technical field of the present invention, can constitute the generation unit 16.

The control unit 17 can perform entire control of the robot 10. For example, the control unit 17 may control the timing when the acquisition unit 12 acquires or outputs choreography data. In addition, the control unit 17 may control storing of choreography data generated by the generation unit 16 in the robot 10. A controller, a control circuit, or a control apparatus, which are explained based on common recognition in the technical field of the present invention, can constitute the control unit 17.

In addition, the control unit 17 can detect (determine) structural differences between the CG model and the robot 10 based on the choreography data for the CG model acquired by the acquisition unit 12, and can control conversion of the choreography data in the generation unit 16 (and/or the reproduction unit 13) based on the differences. It is assumed that the control unit 17 stores beforehand the information relating to the structure of the robot 10. The information relating to the structure of the robot 10 is, for example, information relating to skeleton structure, initial state of a hierarchical structure relating to the skeleton structure, reference posture, length of each bone, or movable range of each joint, although it is not limited to these examples. The skeleton structure will be described in detail below with reference to FIGS. 4A and 4B.

In addition, the control of the control unit 17 may include outputting the converted choreography data for the robot 10 to the reproduction unit 13 via the acquisition unit 12. When holding information about the structure of another robot 10, the control unit 17 may control the generation unit 16 in such a way as to generate choreography data for the another robot 10.

Similar to the robot 10, each of the user terminal 20, the server 30, and the electronic musical instrument 40 may include the whole or a part of the functional block illustrated in FIG. 3 to realize an information processing method according to one aspect of the present invention and constitute a data conversion apparatus according to one aspect of the present invention. For example, the user terminal 20, the server 30, and the electronic musical instrument 40 may be configured to correct choreography data for the predetermined CG model, instead of the robot 10, and may be configured to generate predetermined choreography data for the robot 10. The generated choreography data for the robot 10 may be stored in the server 30 and may be transmitted to the robot 10.

Alternatively, some of the functional blocks illustrated in FIG. 3 may be united as a data conversion apparatus according to an embodiment of the present invention. The data conversion apparatus includes at least the acquisition unit 12, the generation unit 16, and the control unit 17. According to the above-mentioned data conversion apparatus, the generation unit 16 can correct the choreography data for the CG model acquired by the acquisition unit 12 based on an instruction from the control unit 17 and can generate choreography data for the robot 10.

The block diagram in the above-mentioned embodiment illustrates the blocks that are functionally discriminable. An arbitrary combination of hardware and software can realize these functional blocks (constituent parts). In addition, means for realizing each functional block is not particularly limited. More specifically, each functional block may by realized by a single physically independent apparatus or may by realized by a plurality of apparatuses, which are two or more apparatuses physically separated and communicatable via an appropriate wired or wireless communication medium.

For example, the whole or a part of each function of the robots 10 and the user terminals 20 may by realized by an appropriate hardware device, such as Application Specific Integrated Circuit (ASIC), Programmable Logic Device (PLD), or Field Programmable Gate Array (FPGA). In addition, a computer apparatus including a processor (Central Processing Unit (CPU)), a communication interface for network connection, a memory, and a computer-readable storage medium storing necessary programs may realize the robot 10 or the user terminal 20. More specifically, the robot 10 or the user terminal 20 according to the embodiment of the present invention may function as a computer that performs processing for converting CG model oriented data structure (choreography data) into data structure (choreography data) suitable for the robot 10.

The processor and the memory are connected via a bus for information communications. The computer-readable storage medium is, for example, a flexible disk, a magneto-optical disk, a read only memory (ROM), an erasable programmable ROM (EPROM), a compact disc-ROM (CD-ROM), a random access memory (RAM), or a hard disk drive. In addition, the program may be transmitted from the network 50 via a telecommunication circuit.

The functional configuration of the robot 10 or the user terminal 20 may be realized by the above-mentioned hardware or may be realized by a software module that can be implemented by the processor, or may be realized by an appropriate combination thereof. The processor causes an operating system to operate to totally control the user terminal. In addition, the processor reads the program, the software module, and the data from the storage medium into the memory to execute various processing.

The program can be any program that causes the computer to execute information processing relating to the choreography data according to one aspect of the present invention. For example, a control program stored in the memory for operations by the processor may realize the control unit 17 of the robot 10. Other functional blocks may be configured similarly.

In addition, software, instructions, and the like may be transmitted and received via an appropriate transmission medium. For example, when the software is transmitted from a website, a server, or any other remote source by using a wired technique, such as coaxial cable, optical fiber cable, twisted pair and digital subscriber line (DSL) and/or by using a wireless technique using infrared ray, wireless microwave, or the like, the wired technique and/or the wireless technique are included within the category of the transmission medium defined.

In one aspect of the present invention, choreography data is used in each of the above-mentioned apparatuses. First, the choreography data format will be described. Then, an exemplary robot operating method using choreography data and an exemplary choreography data adjustment method considering structural differences between a CG model and the robot will be described.

Choreography Data Format

The choreography data format according to one aspect of the present invention is a format for data including time-series information required to designate coordinates of constituent components of a CG model on a beat basis in time series. The "beat basis" means that the "beat" serves as units in specifying something. It should be noted that the "beat basis" is not limited to 1-beat basis, and should be considered as including fractional beat basis (e.g., one-eighth beat basis) and plural beat basis (e.g., 2-beat basis).

As mentioned above, the inventors have enthusiastically studied movement data of a CG model that can be easily synchronized with sound data. As a result of considering reproducibility of movement, amount of data, and cooperation with other systems, the inventors have found that the saving format of performance information about an electronic musical instrument is preferable in expressing a data structure on a beat basis, and have reached the choreography data format according to one aspect of the present invention.

Prior to detailed description of a concrete format, first, an exemplary CG model expression method will be described below. In the present specification, a skeleton model having a skeleton structure (multiple-joint structure) is employed as an exemplary CG model. However, the CG model to which the present invention is applicable is not limited to the above-mention example.

Figure 4A:
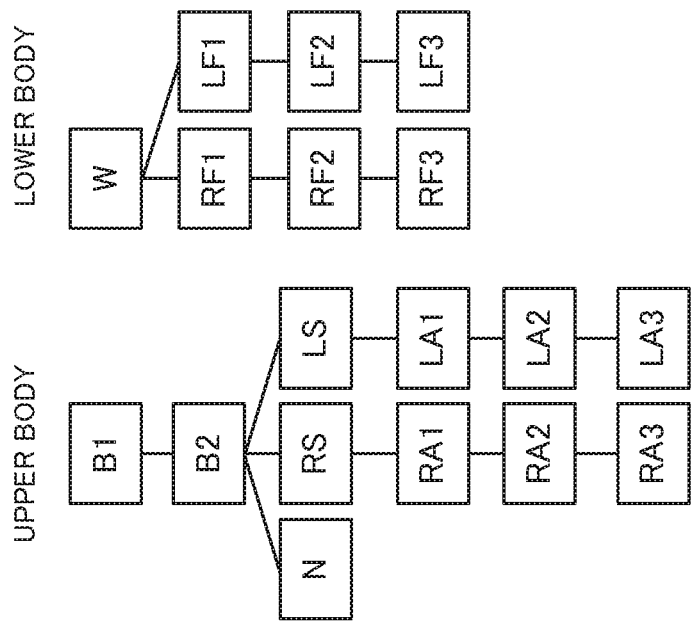
FIGS. 4A and 4B illustrates an exemplary skeleton model having a skeleton structure (multiple-joint structure).
Figure 4B:
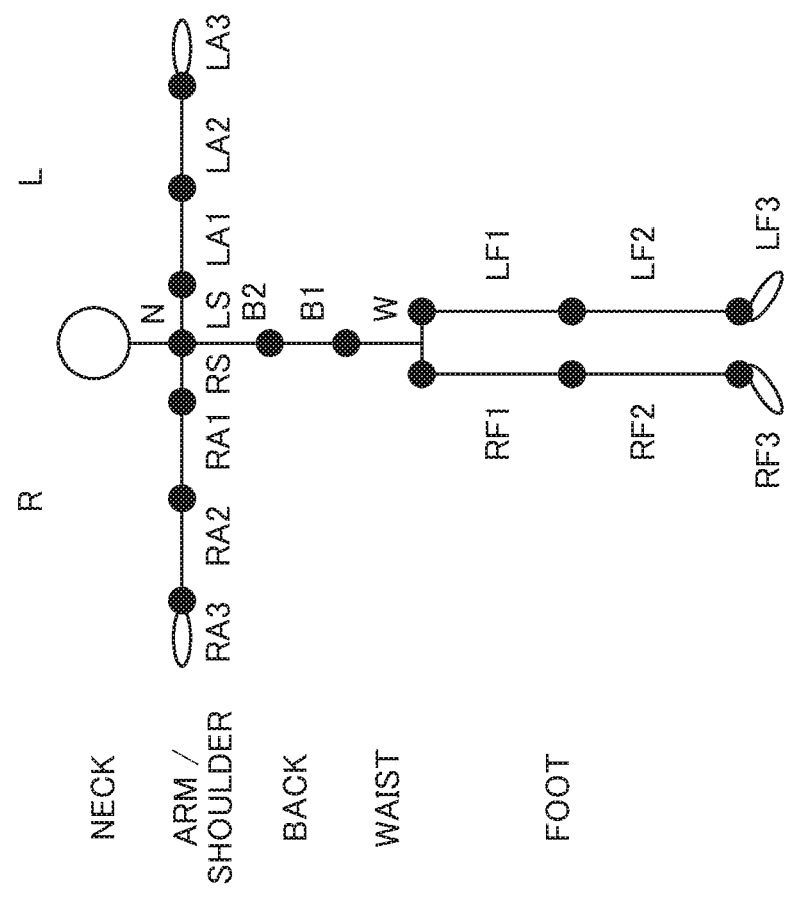

FIGS. 4A and 4B illustrate an exemplary skeleton model having the skeleton structure (multiple-joint structure). FIG. 4A illustrates each constituent component of the skeleton model and a reference posture thereof, and FIG. 4B illustrates a relationship between respective constituent components of the skeleton model. The example illustrated in FIGS. 4A and 4B is a fundamental configuration and may include additional structural components (e.g., skin, fingers, hair, costume, hat, stick, etc.).

A plurality of skeletons constitutes the model illustrated in FIG. 4A, in which two joint points and a single bone connecting them constitute each skeleton. In FIG. 4A, respective bones have their names "N", "RS", or the like, and the illustrated example includes 18 bones.

In general, the skeleton model has a specific joint point serving as a reference point (root) and bones are connected via each of the joint points to constitute a hierarchical structure. FIG. 4B expresses an exemplary hierarchical structure of the model illustrated in FIG. 4A. According to the example illustrated in FIGS. 4A and 4B, the joint point between B1 and W serves as a root. In addition, in the comparison of respective joint points and bones, the one closer to the root is referred to as "parent" and the one farther from the root is referred to as "child".

When arranging a CG model in a three-dimensional space, the model is modeled in a model-oriented coordinate system (local coordinate system) including a root as the reference position. The modeled CG model is then mapped on the coordinate system (world coordinate system or global coordinate system) representing the whole three-dimensional space.

Absolute coordinates or relative coordinates of the three-dimensional space may be used to express the coordinates of a constituent component (a joint point, a bone, or the like). The angle relative to a specific bone having a predetermined reference joint point may be used in expression of the coordinates. For example, when using the relative angle of a bone to express the coordinates, the T-shaped posture illustrated in FIG. 4A is employable as the reference posture of the CG model, and the angle of each bone at this posture may be set to 0°.

The hierarchical structure and the root position are not limited to the example illustrated in FIGS. 4A and 4B. For example, the root may be positioned between right and left feet (between RF3 and LF3). In addition, the forward kinematics sequentially performing calculations from the root to the end may be employable to calculate the coordinates and/or angles of respective constituent components. The inverse kinematics performing calculations inversely from the child position to the parent position may be employable similarly. An appropriate combination of the above two or any other method may be employable. Further, in addition to the above-mentioned hierarchical structure, the skeleton structure may include settings of initial state of the hierarchical structure, the length of each bone, and the movable range of each joint or the like.

SMF Format and Choreography Data Format

As mentioned above, the choreography data format according to one aspect of the present invention is desired to conform to the saving format of performance information about an electronic musical instrument. In particular, the saving format of widely prevalent MIDI data is preferable. Next, a Standard MIDI File (SMF) format, which is a practical example of the saving format of MIDI data, will be schematically described and a choreography data format conforming to the SMF format will be described too.

A header chunk including predetermined control information and a track chunk including performance data constitute the SMF format. A combination of delta time and MIDI event constitute performance data. The delta time represents time duration until the next MIDI event occurs. In addition, the MIDI event represents performance contents, such as note-on (sound is produced), note-off (sound is stopped), and the like.

Figure 5:
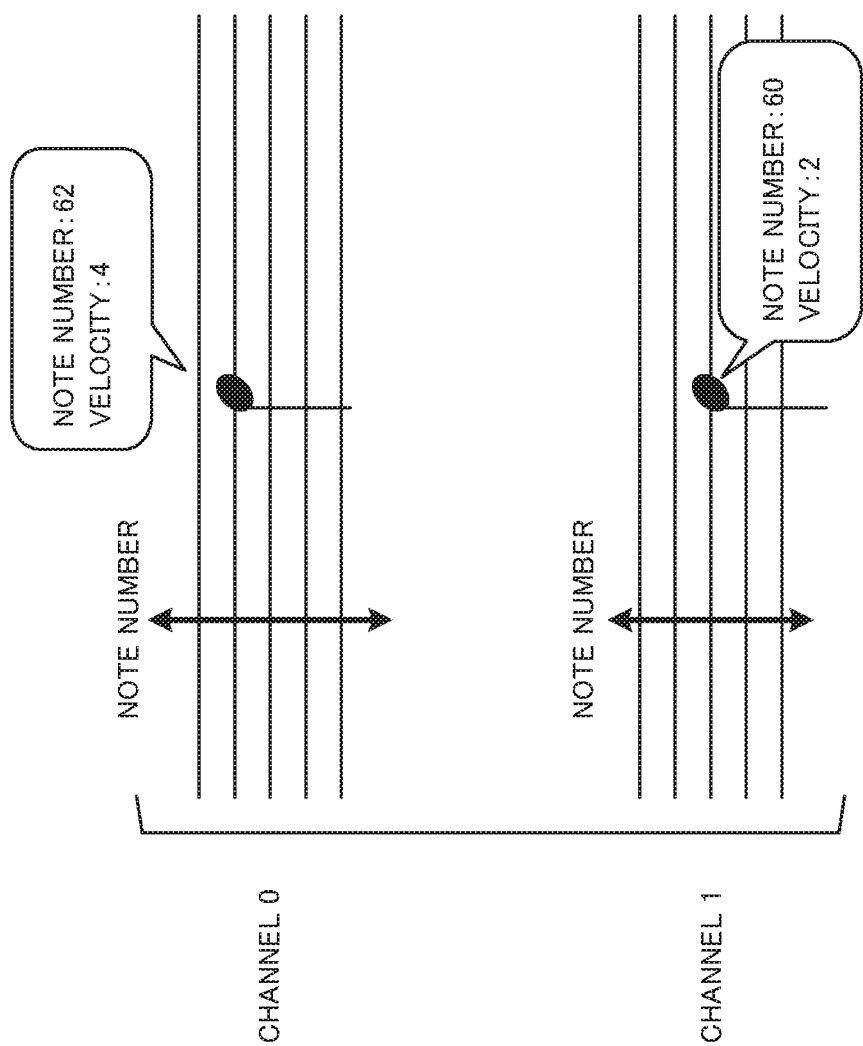
FIG. 5 is a conceptual explanatory view of a note-on signal.

Note-on signal indicates the output of specific sound after the elapse of corresponding delta time. For example, the note-on signal can be expressed in three bytes of "9n kk vv" in hexadecimal, which indicates, "emitting a sound of note number kk in channel n at velocity vv". FIG. 5 is a conceptual explanatory view of an exemplary note-on signal. As illustrated in FIG. 5, the channel represents part of a musical score (e.g., performance part of a predetermined instrument), the note number represents the height of sound, and the velocity represents the speed (intensity) of hitting the instrument (keyboard).

Note-off signal indicates muting specific sound after the elapse of corresponding delta time. For example, the note-off signal can be expressed in three bytes of "8n kk vv" in hexadecimal, which indicates, "silencing a sound of note number kk in channel n at velocity vv".

Each of the note number and the velocity can be a decimal number in the range from 0 to 127. The note-on signal "9n kk 00" whose velocity is 0 has the same meaning as the note-off signal indicating, "silencing a sound of note number kk in channel n".

The note-on signals corresponding to crotchets in channels 0 and 1 in FIG. 5 can be expressed as "90 3E 04" and "91 3C 02", respectively.

In one aspect of the present invention, each channel is regarded as information relating to coordinates of any one of constituent components of each CG model. More specifically, the choreography data format can be configured to include a plurality of pieces of beat-basis time-series information about the coordinates of a constituent component of the CG model. The information about the coordinates of a constituent component (e.g., a bone, a joint point, or the like) may be, for example, information relating to absolute coordinates or relative coordinates of the constituent component or may be expressed as a relative angle to the constituent component (e.g., bone).

The note number and/or velocity of a note-on signal can be used as information about the coordinates of a constituent component of a CG model. In this case, the angle and/or coordinates of a specific axis of a predetermined constituent component at certain timing can be acquired from a note-on signal arranged at a beat corresponding to such timing. In addition, the delta time of a note-on signal and/or a note-off signal may be used as information relating to the length of a beat where the coordinates of a constituent component of a CG model change.

For example, the delta time corresponding to a note-off signal may indicate the length of a beat required to transfer from an angle (or coordinates) calculated based on a note-on signal immediately preceding the note-off signal to an angle (or coordinates) calculated based on a note-on signal immediately following the note-off signal. The transition of the angle and/or coordinates of a predetermined constituent component associated with each note can be performed according to predetermined rules. For example, the speed or the acceleration during the transition may be determined and used based on a predetermined interpolation method. The delta time is preferably a positive number.

As the note-on/off signal is most frequently used in the SMF format, an electronic musical instrument corresponding to MIDI or the like can speedily perform the processing.

In the note-on signal, the note number may serve to roughly specify the coordinates or the angle in relatively larger units and the velocity may serve to precisely specify the coordinates or angle in relatively smaller units. For example, when the note-on signal in a certain channel represents an angle in a specific axial direction (e.g., relative angle to x-axis), the following Formula 1 is usable to calculate the angle θ.

$$\theta = (N - N_0) \times \theta_N + (V - V_0) \times \theta_v \quad \text{(Formula 1)}$$

In this formula, N represents note number, $N_0$ represents reference note number, $\theta_N$ represents angular increment per note number increment, V represents velocity, $V_0$ represents reference velocity, and $\theta_v$ represents angular increment per velocity increment.

For example, $N_0$ may be 60 (corresponding to "C(do)" sound in the center of the keyboard), $V_0$ may be 1, $\theta_N$ may be 5', and $\theta_v$ may be 0.05°. However, $N_0$, $V_0$, $\theta_N$, and $\theta_v$ are not limited to these exemplary values.

In addition, when a note-on signal in a certain channel represents the coordinates in a specific axial direction, the following formula 2 is usable to calculate a position P of the coordinates.

$$P = (N - N_0) \times P_N + (V - V_0) \times P_v \quad \text{(Formula 2)}$$

In this formula, N represents note number, $N_0$ represents reference note number, $P_N$ represents coordinate increment per note number increment, V represents velocity, $V_0$ represents reference velocity, and $P_v$ represents coordinate increment per velocity increment.

For example, $N_0$ may be 60 (corresponding to "C(do)" sound in the center of the keyboard), $V_0$ may be 1, $P_N$ may be 64 cm, and $P_v$ may be 0.5 cm. In addition, $P_N$ may be 127 cm and $\theta_v$ may be 1 cm. However, $N_0$, $V_0$, $P_N$, and $P_v$ are not limited to these exemplary values.

In addition, as another employable configuration contrary to the above-mentioned example, the velocity may serve to roughly specify the coordinates or angle in relatively larger units and note number may serve to precisely specify the coordinates or angle in relatively smaller units. Further, using a system exclusive (SysEx) event or any other signal different from the note-on/off signal may be usable to specify information about the coordinates of a constituent component of a CG model.

The information about the coordinates of a constituent component can be classified into, for example, position information and pose information. The position information indicates a relative position from an initial position of a CG model (e.g., a position at start timing of CG moving image). For example, the position information may be expressed by x-axis coordinate, y-axis coordinate, and z-axis coordinate of the reference point (root) of the CG model and the rotation angle of the reference point. The pose information indicates an angle or a position based on the reference posture of the CG model. For example, the T-shaped posture illustrated in FIG. 4A can be set to 0°. Using x-axis relative angle, y-axis relative angle, and z-axis relative angle may be useful to express a relationship between a parent bone and a child bone with respect to some designated bones.

Which channel the information about each coordinate of each constituent component (e.g., a bone) is to be allocated to can be appropriately selected depending on the operation mode of a system. When allocating a single channel to the information about the coordinates of a constituent component, the number of channels required to express the CG model comes to 58 channels in total if the number of designated bones is 18. More specifically, the pose information requires 54 channels, i.e., 18 (the number of bones)×3 (the number of axes) and the position information requires four channels, i.e., 3 (position coordinates)+1 (position reference angle). As a single MIDI port can include 16 channels, four MIDI ports can express the coordinates and the posture of a CG model constituted by 18 bones in total. If expressions and fingertips of a CG model are required to express, more additional channels will be required and accordingly the number of required MIDI ports will increase.

On the other hand, it may allocate a single channel to a plurality of pieces of information about the coordinates of a constituent component. For example, one channel can be constituted to express x-axis relative angle, y-axis relative angle, and z-axis relative angle of predetermined bone. In this case, for example, the note number is divided into three, so that relatively smaller note numbers (e.g., 0 to 42) can be used as the x-axis relative angle, relatively intermediate note numbers (e.g., 43 to 85) can be used as the y-axis relative angle, and relatively larger note numbers (e.g., 86 to 127) can be used as the z-axis relative angle, although the allocation method is not limited to the above-mentioned one.

The SMF format to which the choreography data format conforms is not particularly limited. For example, the SMF format may be format 0 including information of all channels in a single track, format 1 constituted by a plurality of tracks, or format 2. Further, a new format different from the existing formats 0 to 2 may be used. In addition, the choreography data format is not limited to the SMF format and can be any other format including information for designating the coordinates of a constituent component of a CG model on a beat basis in time series.

Figure 6:
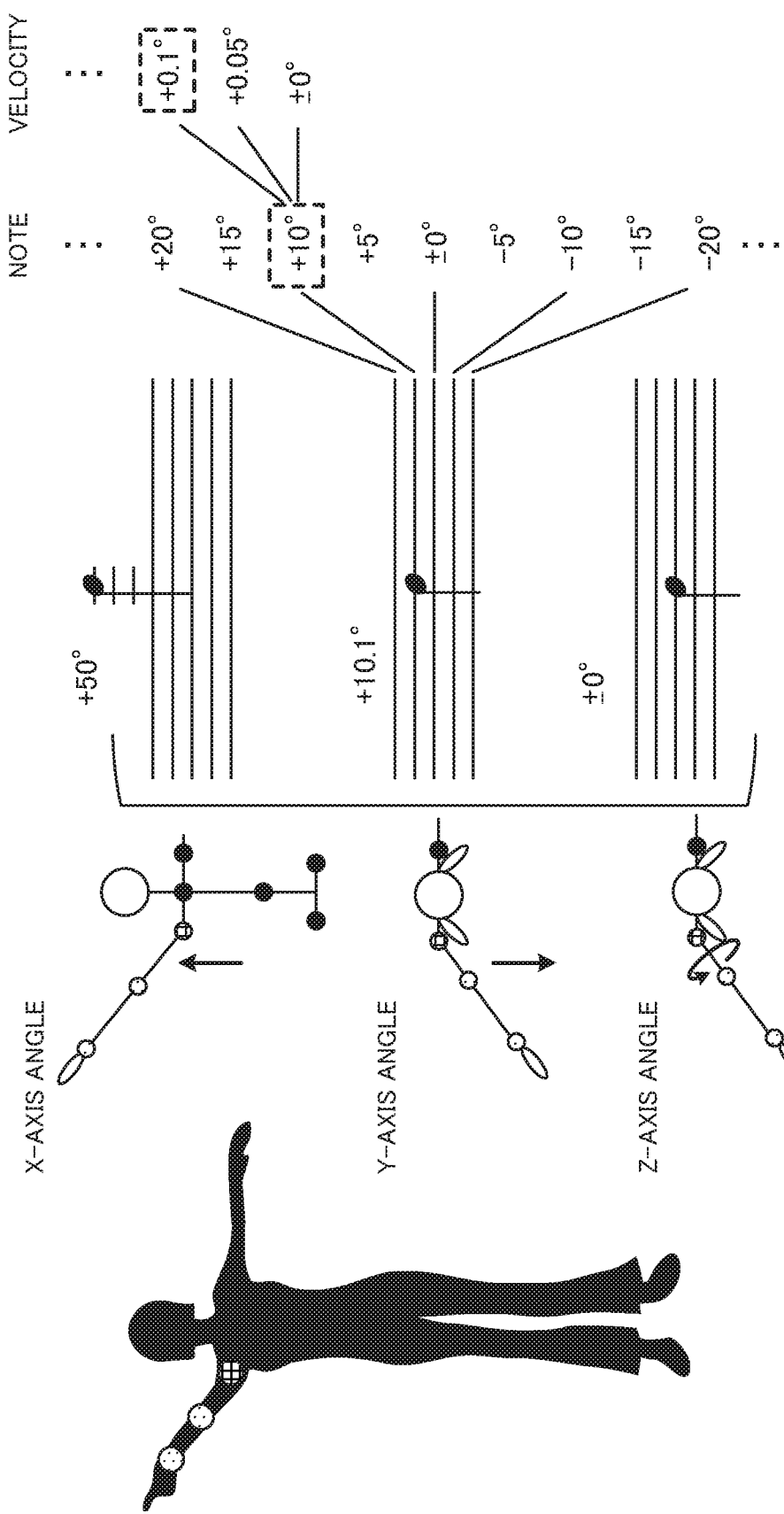
FIG. 6 illustrates an exemplary correspondence relation between note-on signals of respective channels and predetermined constituent components in a data structure according to an embodiment of the present invention.

FIG. 6 illustrates an exemplary correspondence relation between note-on signals of respective channels and predetermined constituent components in the data structure according to the present invention. As mentioned above, as an embodiment of the skeleton model, the angle of each joint (or each bone) is expressed by three elements of x-axis angle, y-axis angle, and z-axis angle. In FIG. 6, information indicating the x-axis angle, the y-axis angle, and the z-axis angle of a bone "RA1" illustrated in FIGS. 4A and 4B is allocated to different channels, respectively. The directions indicated by the x-axis angle, the y-axis angle, and the z-axis angle in FIG. 6 are merely examples, and the present invention is not limited to the illustrated examples. In addition, it is assumed that the note number corresponding to the center line of a staff score illustrated in FIG. 6 is 60 in decimal notation, $N_0$ is 60, $V_0$ is 1, $\theta_N$ is 5°, and $\theta_v$ is 0.05° in Formula 1.

In FIG. 6, the note-on signal of the channel corresponding to the x-axis angle has a note number of 70 in decimal notation and a velocity of 1. Therefore, according to Formula 1, the x-axis angle is +50°. The note-on signal of the channel corresponding to the y-axis angle has a note number of 62 and a velocity of 3. Therefore, according to Formula 1, the y-axis angle is +10.1°. The note-on signal of the channel corresponding to the z-axis angle has a note number of 60 and a velocity of 1. Therefore, according to Formula 1, the z-axis angle is 0°.

Figure 7:
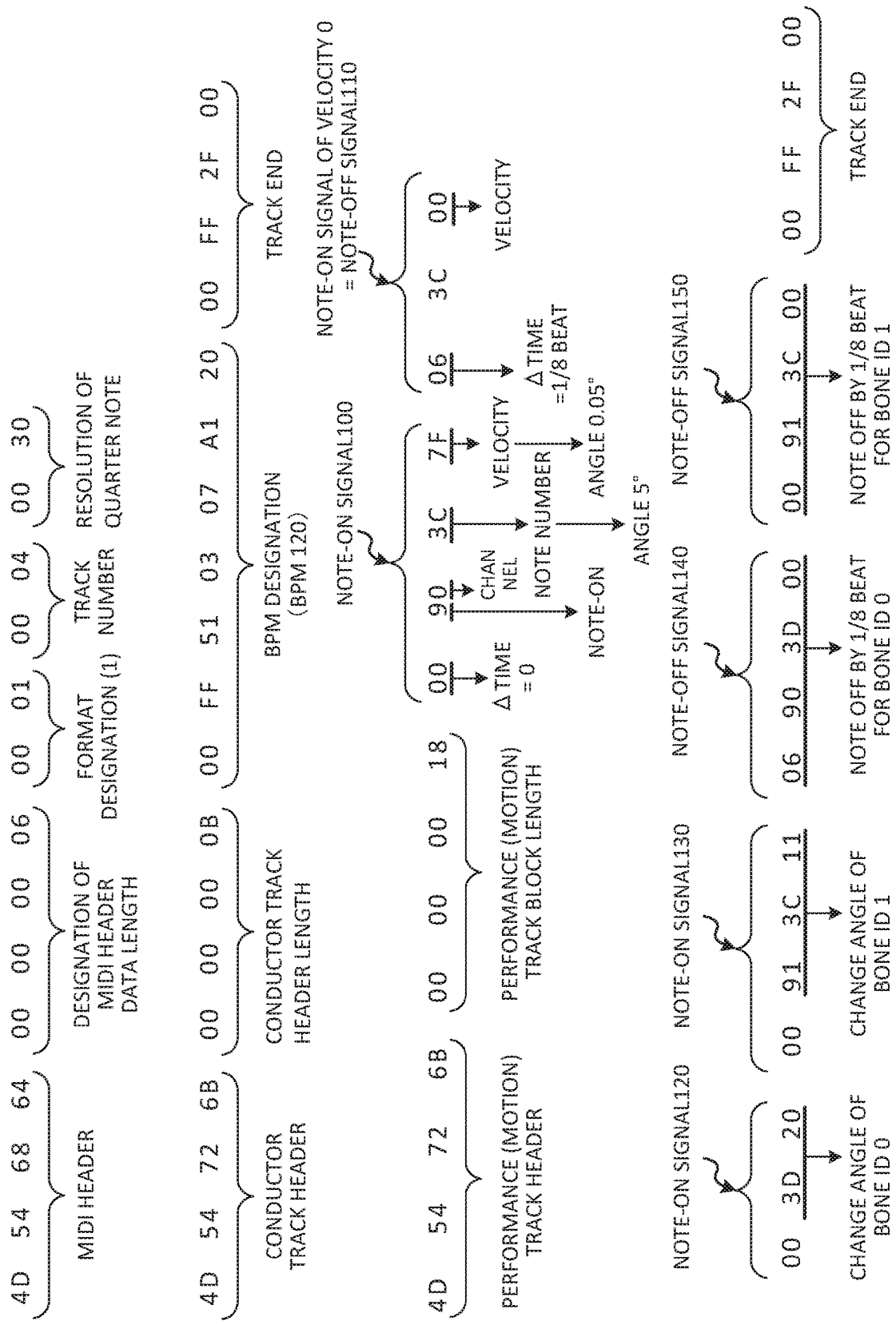
FIG. 7 illustrates exemplary specific data conforming to a choreography data format according to an embodiment of the present invention.

FIG. 7 illustrates exemplary specific data conforming to the choreography data format according to the present invention. The illustration of FIG. 7 includes data strings in units of byte and the corresponding information. Although extending over a plurality of rows in FIG. 7, the data strings are actually continuous data. Further, the choreography data format illustrated in FIG. 7 conforms to SMF format 1, although the present invention is not limited to the illustrated example.

The data string of the first row in FIG. 7 corresponds to a MIDI header. The resolution of a quarter note is set to 48. The data string of the second row in FIG. 7 corresponds to a conductor track. In general, the conductor track designates the tempo by using the units of Beats Per Minute (BPM). In FIG. 7, a setting value of the BPM is 120. The data strings in the third and fourth rows in FIG. 7 correspond to ordinary tracks (performance tracks).

A note-on signal 100 instructs start of emitting a sound of note number 3C and velocity 7F in channel 0 (for example, corresponding to the x-axis angle of bone ID 0). A corresponding note-off signal 110 terminates the note-on signal 100. The delta time of the note-off signal 110 is 6 (corresponding to one-eighth beat). Therefore, it indicates that the time required in transition from the angle indicated by the note-on signal 100 to the angle indicated by the next note-on signal (note-on signal 120) is one-eighth beat.

In addition, when signals of the same channel are continuous, using running status can omit the second and subsequent status bytes (see the note-on signals 110 and 120). A note-on signal 130 includes information relating to another channel (channel 1). In addition, note-off signals 140 and 150 correspond to the note-on signals 120 and 130, respectively.

As described above, the choreography data format according to the present invention is compatible with, for example, the SMF format and includes time-series information (repetition of the note-on/off signal) for designating the coordinates of a constituent component of a CG model, on a beat basis, in time series, in each channel of MIDI. Employing the SMF format as data structure can facilitate the cooperation between the motion of a CG model (eventually a motion of a robot) and any other device, such as an electronic musical instrument, or system.

It is desired that the choreography data includes pose information based on three specific angles of a predetermined number of designated bones and position information composed of four axes, for each frame period corresponding to the length of a predetermined beat. The predetermined frame period can be specified based on a predetermined tempo (e.g., BPM). For example, the predetermined frame period may correspond to the length of a certain beat (for example, one beat, one-eighth beat, etc.) at the predetermined tempo. In addition, the predetermined frame period can be calculated by multiplying the length of the beat by the number of frames per unit time (e.g., Frames Per Second (FPS)).

Figure 8:
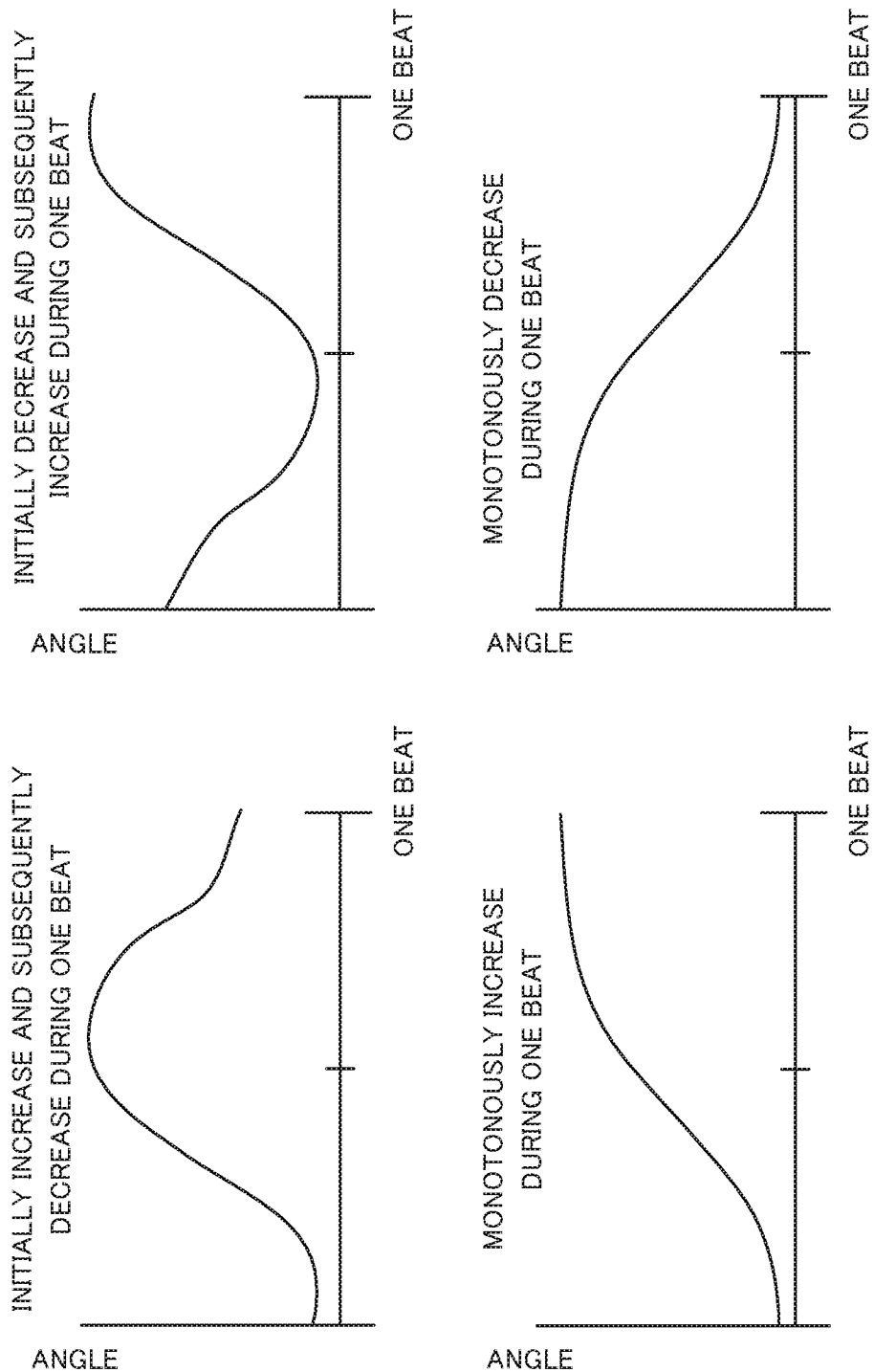
FIG. 8 illustrates typical angular change patterns in one beat.
Figure 9:
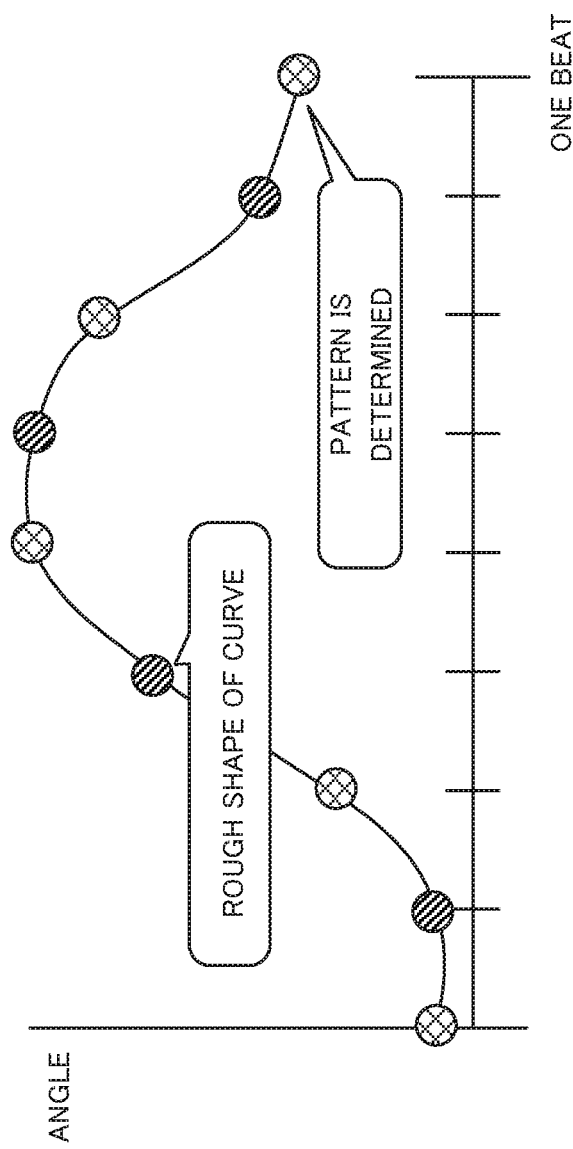
FIG. 9 illustrates an example of extracting each one-eighth beat from one beat.

More specifically, it is desired that the choreography data holds information in the units of one-eighth beat. The reasons for this will be described with reference to FIGS. 8 and 9. FIG. 8 illustrates an example of typical angular change patterns in one beat, and FIG. 9 illustrates an example of extracting each one-eighth beat from one beat.

The inventors have focused on various changes in the movement (e.g., the angle) of a constituent component of a living creature (e.g., a person, an animal, or the like), which can be expressed by any one of four (initially increase and subsequently decrease, initially decrease and subsequently increase, monotonously increase, and monotonously decrease) patterns illustrated in FIG. 8, when seen on a beat basis. In addition, as a result of such inventive studies, the inventors have found that extracting eight points within one beat as illustrated in FIG. 9 can determine the change pattern of a movement and can reproduce the rough shape of a movement transition curve, and have come to an idea of holding information as choreography data in the units of one-eighth beat.

The time-series information included as choreography data is not limited to the units of one-eighth beat and may be appropriately increased or decreased in consideration of a tradeoff between the amount of data and the reproducibility of original motion data.

Flow of Robot Motion Using Data Conforming to Choreography Data Format

Figure 10:
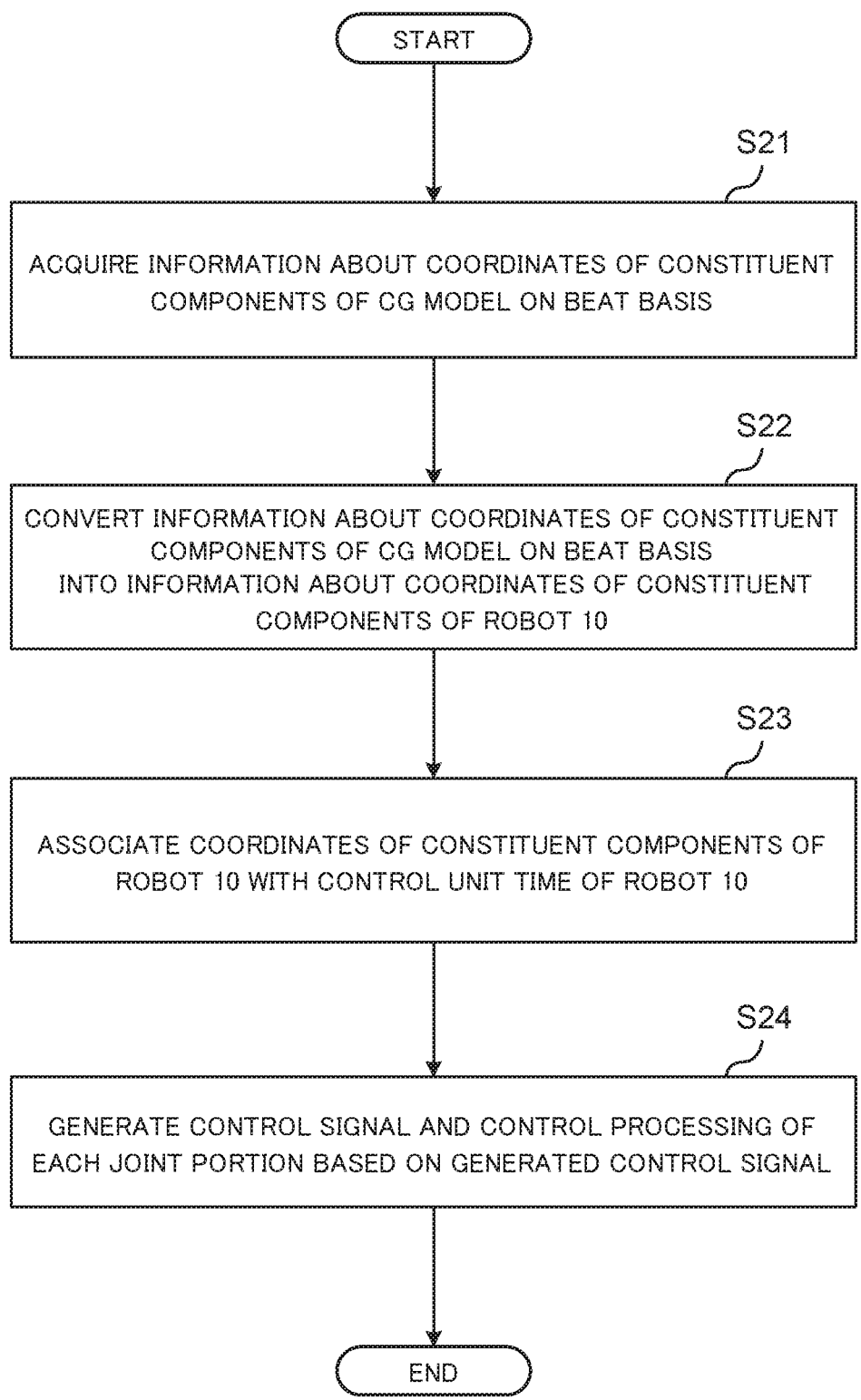
FIG. 10 is a flowchart illustrating an exemplary operation of a robot using motion data conforming to the choreography data format.

FIG. 10 is a flowchart illustrating an exemplary operation of a robot using motion data conforming to the choreography data format. In addition, as examples of the flow illustrated in FIG. 10, practical processing contents that can be performed by respective functional blocks illustrated in FIG. 3 will be described in detail below with reference to FIGS. 11 and 12.

Figure 11:
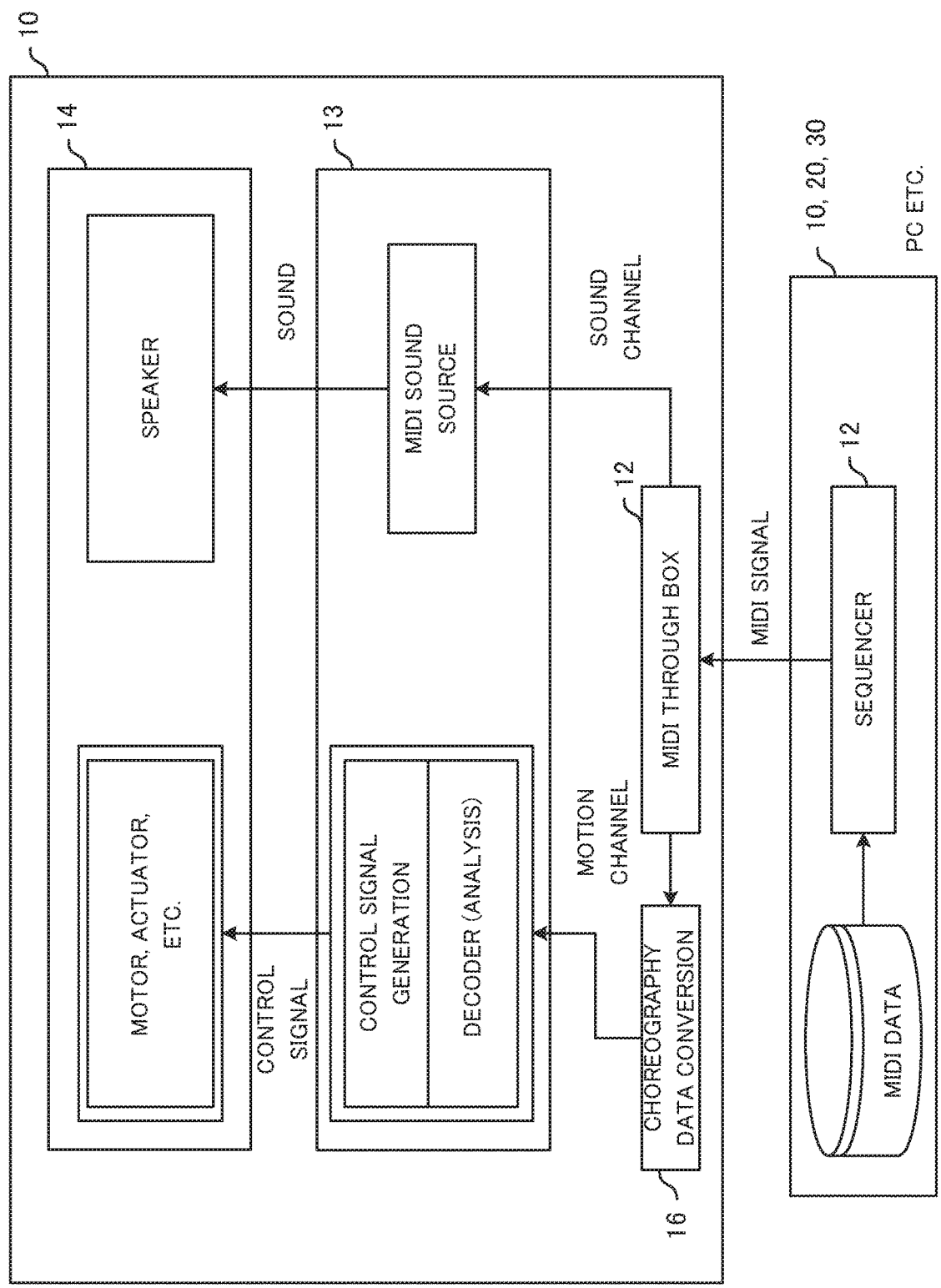
FIG. 11 illustrates an exemplary operation based on stored choreography data.
Figure 12:
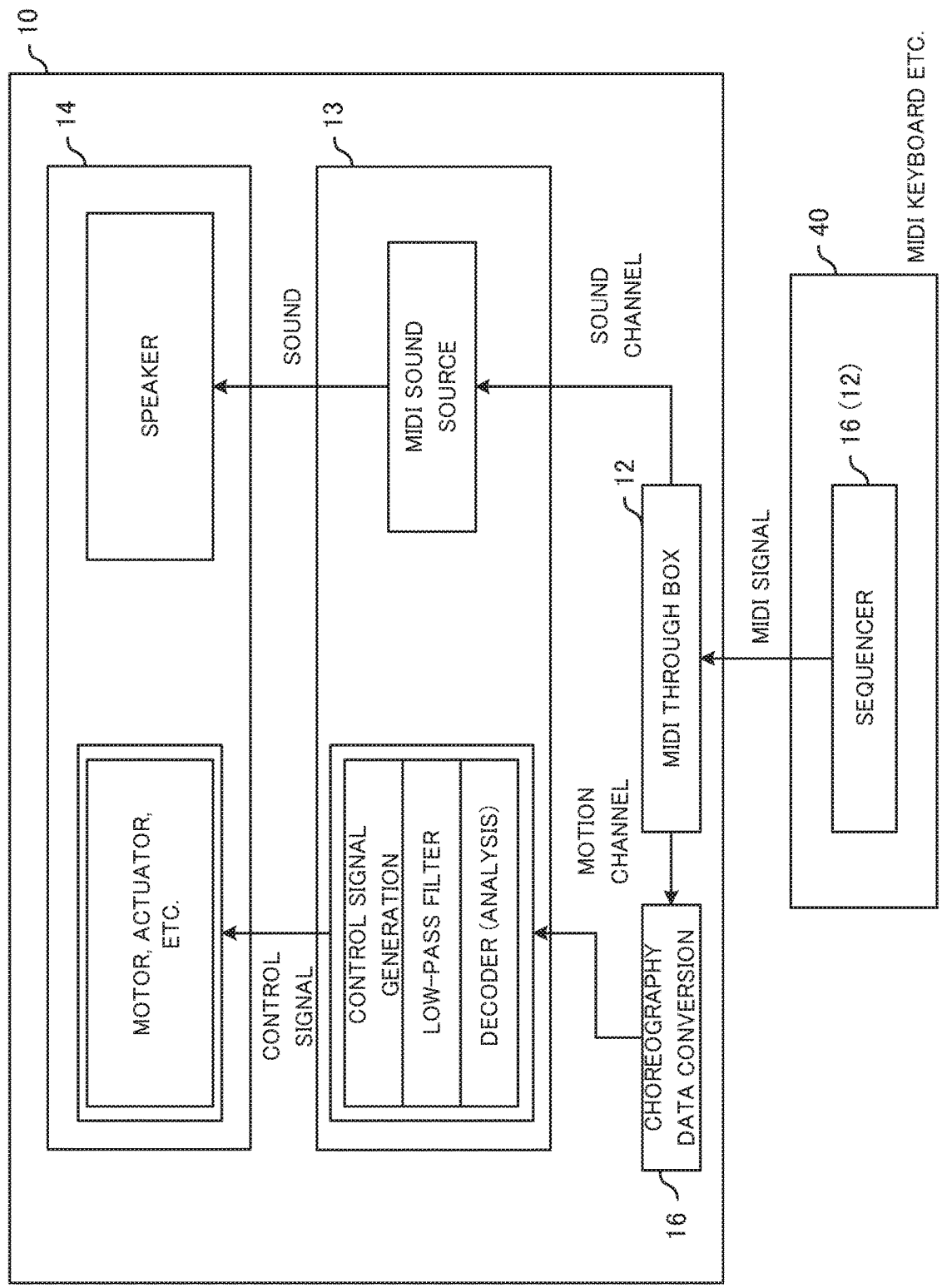
FIG. 12 illustrates an exemplary operation based on choreography data in real time.

FIG. 11 illustrates an exemplary operation based on stored choreography data. In addition, FIG. 12 illustrates an exemplary operation based on choreography data generated in real time. In FIG. 11, the robot 10 operates based on choreography data stored in another robot 10, the user terminal 20, or the server 30. In FIG. 12, the robot 10 operates based on choreography data output from the electronic musical instrument 40. However, the present invention is not limited to these illustrated examples. For example, the robot 10 can operate based on choreography data stored in its storage.

In FIG. 11, a sequencer acquires MIDI data (choreography data) and therefore corresponds to the acquisition unit 12 illustrated in FIG. 3. In addition, in FIG. 12, the sequencer generates and acquires a MIDI signal (choreography data) and therefore corresponds to the generation unit 16 (and the acquisition unit 12) illustrated in FIG. 3. In addition, in FIGS. 11 and 12, a MIDI Thru Box acquires the MIDI signal (choreography data) and therefore corresponds to the acquisition unit 12 illustrated in FIG. 3. Although not illustrated in detail in FIGS. 11 and 12, the transmission and reception unit 11 can transmit and receive the MIDI signal via the network 50.

In addition, in FIGS. 11 and 12, it is assumed that the MIDI signal received by the robot 10 includes a channel indicating choreography data (which may be referred to as motion channel) and a channel indicating sound data (which may be referred to as sound channel, musical channel, or the like), although the MIDI signal is not limited to the above one and can be any other one as long as it includes at least choreography data.

In the flowchart illustrated in FIG. 10, first (in step S21), information (relative angle or the like) relating to the coordinates of respective constituent components of a CG model in each predetermined beat is acquired. More specifically, in step S21, the acquisition unit 12 (MIDI Thru Box) acquires the MIDI signal and separates it into the motion channel and the sound channel, and then outputs the motion channel to the generation unit 16.

Next, the information about the coordinates of constituent components of the CG model at each beat is converted into information about the coordinates of respective constituent components of the robot 10 (in step S22). For example, the generation unit 16 performs the conversion and outputs conversion results to the reproduction unit 13. The above conversion may by realized by performing coordinate conversion (e.g., position and angle adjustments) for each constituent component of the CG model, considering skeleton structures of the CG model and the robot 10, the initial state of the hierarchical structure, the reference posture, the length of each bone, as well as structural and operational limitations (e.g., movable range of each joint, moving speed limitation, etc.) of the robot 10 described below. In addition, the choreography data may be configured to include the parameters to be considered in the above-mentioned conversion.

Next, the coordinates of the constituent components of the robot 10 are associated with control unit time of the robot 10 (step S23). In step S23, the reproduction unit 13 first causes a decoder to analyze the choreography data (the SMF format) output from the generation unit 16, and acquires time-series information about the coordinates of each constituent component based on the note-on/off signal of each channel.

The association in step S23 may be performed based on the predetermined tempo (e.g., BPM) and the control unit time (for example, the minimum time to be a control unit determined by the performance of the CPU, the motor, etc.) of the robot 10. The control unit time of the robot 10 may be associated with the number of frames (e.g., FPS) to be processed per unit time when displaying the CG model as a moving image.

When the choreography data includes information relating to the tempo, the predetermined tempo may be acquired from such information. In addition, it may be the tempo detected from other data (e.g., music data) reproduced in synchronization with a motion of the robot 10 or the tempo being set from the outside or stored in advance.

More specifically, in step S23, the reproduction unit 13 acquires a first BPM from the choreography data in step S21 (or the conversion results in step S22). In addition, the reproduction unit 13 may acquire a second BPM from the data (e.g., music data) reproduced in synchronization with a motion of the robot 10. Subsequently, the reproduction unit 13 adjusts the time-series information acquired in step S21 in the time direction based on the first BPM and the second BPM. For example, when the first BPM and the second BPM are different from each other, the reproduction unit 13 expands and contracts the time-series information acquired in step S21 by an amount of value obtained by diving the first BPM by the second BPM.

As mentioned above, the reproduction unit 13 determines the coordinates of respective constituent components (positions, angles, etc.) at the time corresponding to each control unit time of the robot 10, based on the time-series information acquired in step S21 or the time-series information subjected to the above-mentioned expansion and contraction. In addition, if there is no coordinate related information corresponding to the predetermined timing (e.g., start timing) of the control unit time, the reproduction unit 13 may determine the coordinates at the above-mentioned time from information about the coordinates of near time by using a predetermined interpolation method (e.g., a sine curve interpolation method).

Since the information relating to the angle or the coordinates included in the choreography data is quantized one, if the original data finely moves in the vicinity of a threshold, rattling may occur in the motion of the robot 10. Therefore, the reproduction unit 13 may suppress the rattling by applying interpolation processing to the angle and/or the coordinates. For example, an exponential moving average using a low-pass filter as illustrated in FIG. 12 may be used in this interpolation processing. In the real-time reproduction illustrated in FIG. 12, the low-pass filter processing is preferable because future data is not available.

Finally, a control signal based on the coordinates of constituent components (joint portions) determined in step S23 is generated and controls the processing of each joint portion is controlled based on the control signal (step S24). More specifically, in step S24, the reproduction unit (control signal generation unit) 13 generates a control signal including information for instructing the rotational speed of the motor at the joint portion, for each control unit time. Then, the output unit 14 transmits the control signal to each joint portion so that the joint portion can be driven to cause the robot 10 to operate. Alternatively, collectively transmitting control signals of a plurality of control unit time may be useful. With respect to a predetermined control unit time, it may not be necessary to transmit a control signal to a predetermined joint portion in some cases (for example, when there is no change in the position and the angle of the predetermined joint portion).

Although the generation unit 16 performs the processing of step S22 in FIG. 10, the process is not limited thereto. For example, in step S21, the acquisition unit 12 may directly output the motion channel to the reproduction unit 13. Subsequently, in step S22, the reproduction unit 13 may interpret CG model oriented choreography data and may perform processing for converting and/or correcting the coordinates, considering structural and operational limitations (e.g., limitations of the angle and the moving speed of each joint point) of the robot 10.

In addition, as illustrated in FIGS. 11 and 12, in response to the entered sound channel, the reproduction unit 13 can be configured to cause a MIDI sound source to perform sound reproduction in such a way as to synchronize with the motion of the robot 10 indicated by the motion channel. The output unit 14 can be configured to cause the speaker to output sounds.

In addition, the example illustrated in FIG. 12 may employ a configuration in which not only the choreography data but also another data (e.g., music data) to be reproduced in synchronization with the motion of the robot 10 can be acquired (streaming distributed) in real time. According to such a configuration, even when packet loss, delay, or the like occurs due to deterioration of communications and the reproduction of the streaming sound source stops, it is feasible to appropriately control the motion of the robot according to the beats of a musical piece as the streaming progresses.

Although the data structure of choreography data and the robot operating method using the choreography data have been described above, when differences between the structure (e.g., skeleton structure) of a CG model and a corresponding structure of the robot are taken into consideration, there will be further problems to be solved. These problems and solutions will be described in detail below.

Balance Adjustment of Bones

The skeleton structure of a robot is not necessarily identical to the skeleton structure of a CG model specified by choreography data. In general, in order to simplify the hardware implementation, the number of bones tends to be reduced compared to that of the CG model. When the skeleton structures do not coincide with each other, if the appropriate adjustment of the bones is not performed, the robot may perform unexpected operations.

<When the Number of Bones Decreases>

The inventors have found that when the number of bones of a robot is reduced compared to that of a CG model it is important to how inherit the information (such as coordinate related information (e.g., inclination of the bone)) owned by a bone of the CG model not existing in the robot (which may be referred to as non-existing bone or omitted bone) to another bone (which may be referred to as existing bone or non-omitted bone), and have conceived the following three inheriting methods:

(1) blending information about an omitted bone with information about an existing bone neighboring the omitted bone at a predetermined ratio (e.g., 100:0, 90:10, etc.);
(2) adding information about an omitted bone to information about an existing bone neighboring the omitted bone; and
(3) ignoring information about an omitted bone and calculating information about an existing bone according to a predetermined method.

The predetermined method in the method (3) may include, for example, calculating the information about the existing bone neighboring the omitted bone so as to prevent the robot from falling down (in such a way as to maintain the initial state (e.g., upright state)), or calculating the information about the existing bone based on information about another existing bone.

The neighboring bone is not limited to an immediately adjacent bone. For example, the neighboring bone may be the next to the next bone. In addition, a bone strongly related to (e.g., often moving together with) the omitted bone may be designated as an inheritance target.

Figure 13A:
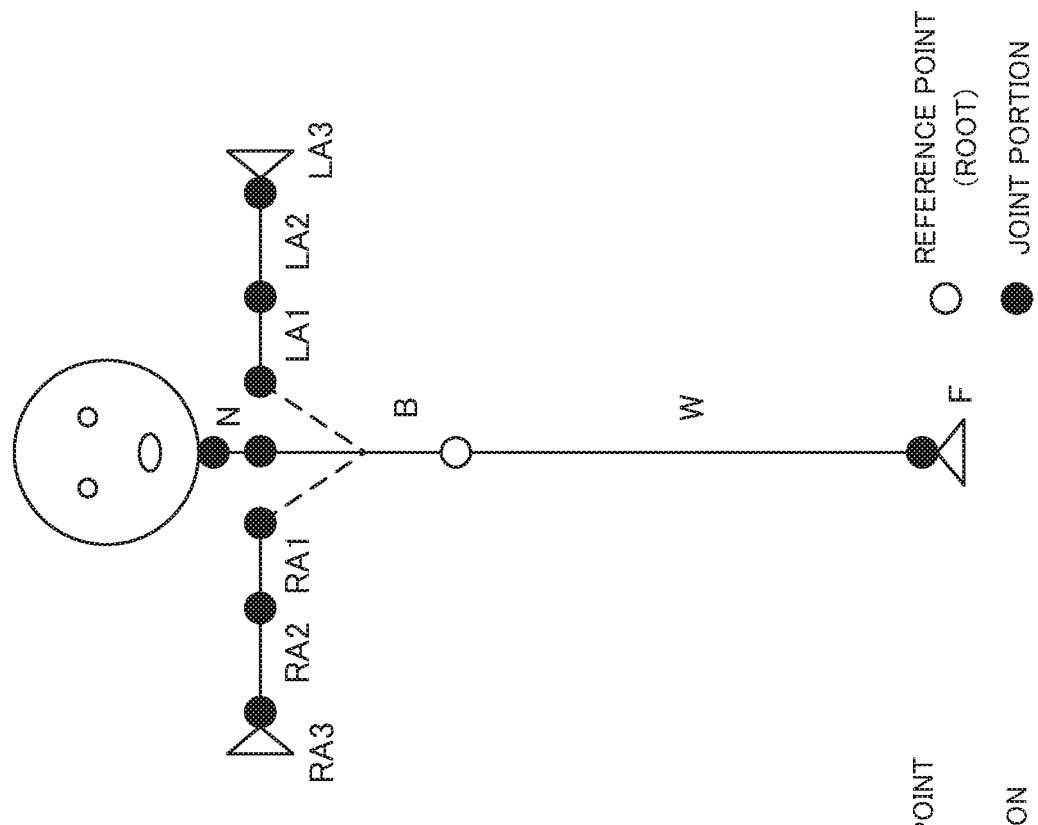
FIGS. 13A and 13B illustrate an exemplary balance adjustment in a case where a skeleton of a CG model is different from a skeleton of a robot.
Figure 13B:
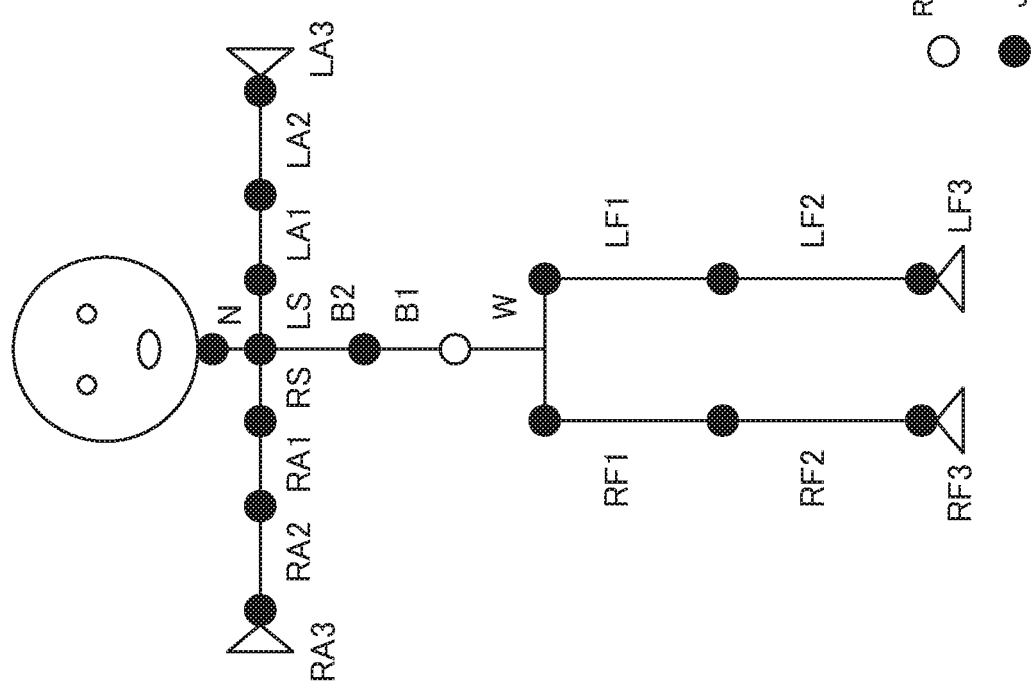

FIGS. 13A and 13B illustrate an exemplary balance adjustment in a case where the skeleton of a CG model is different from the skeleton of a robot. FIG. 13A illustrates the skeleton of the CG model, and FIG. 13B illustrates the skeleton of the robot. According to the example illustrated in FIGS. 13A and 13B, two clavicles, one spine, and a leg bone are omitted bones in the skeleton of the robot. The configurations illustrated in FIGS. 13A and 13B are similar to the configurations illustrated in FIGS. 2A and 2B, respectively.

Regarding the spine, as it is considered that a single bone can express the movement of two spines, it is desired to employ the above-mentioned method (1) to blend the bone information. Accordingly, the reproduction unit 13 illustrated in FIG. 3 may determine the coordinates (e.g., position, angle, etc.) of a bone B illustrated in FIG. 13B by blending the coordinates of bones B1 and B2 in FIG. 13A at a predetermined ratio.

In addition, since most of the movements of the clavicle are for assisting a corresponding upper arm, it is desired to add the information about the clavicle to the information about the corresponding upper arm according to the above-mentioned method (2). Therefore, the reproduction unit 13 illustrated in FIG. 3 may determine the coordinates (e.g., position, angle, etc.) of a bone RA1 (LA1) illustrated in FIG. 133 by adding the coordinates of a bone RA1 (LA1) to the coordinates of a bone RS (LS) in FIG. 13A.

Regarding the legs, since forcibly reproducing non-existing legs may collapse the balance, it is desired to employ the above-mentioned method (3) to perform adjustment to prevent the robot from falling down while ignoring the information about the legs of the CG model. Accordingly, the reproduction unit 13 illustrated in FIG. 3 may determine the coordinates (position, angle, etc.) of a bone W (and/or F) illustrated in FIG. 13B based on the coordinates of another bone (for example, so that the bones B, W, and F are aligned on a straight line) while ignoring the coordinates of bones W, RF1-3, and LF1-3 illustrated in FIG. 13A.

<When the Number of Bones Increases>

For example, in order to express finer movements, it may be useful to increase (divide and increase) bones (spine, etc.) included in a standard bone model in an intermediate division manner. The inventors have found that when the number of bones of a robot increases compared to that of a CG model (more specifically, when a plurality of bones is used to express a predetermined bone) it is important to maintain the characteristics of increased bones and have conceived the following two inheriting methods:

(1) holding the angle of the intermediately divided bone at a predetermined ratio (e.g., 50:50) to match the final angle; and
(2) calculating the angle of each increased bone in such a way as to hold the arrival position of the intermediately divided bone.

In a case where the bone angle is important (for example, when a person viewing the robot is sensitive to the change of a hand or a similar portion in the bone angle when feeling different posture or expression), employing the above-mentioned method (1) is desired. In a case where the joint point position is important (for example, when a concerned portion (e.g., a leg or a trunk portion) may collapse the balance of the robot if its position changes or may be important for the motion of the robot), employing the above-mentioned method (2) is desired.

Figure 14A:
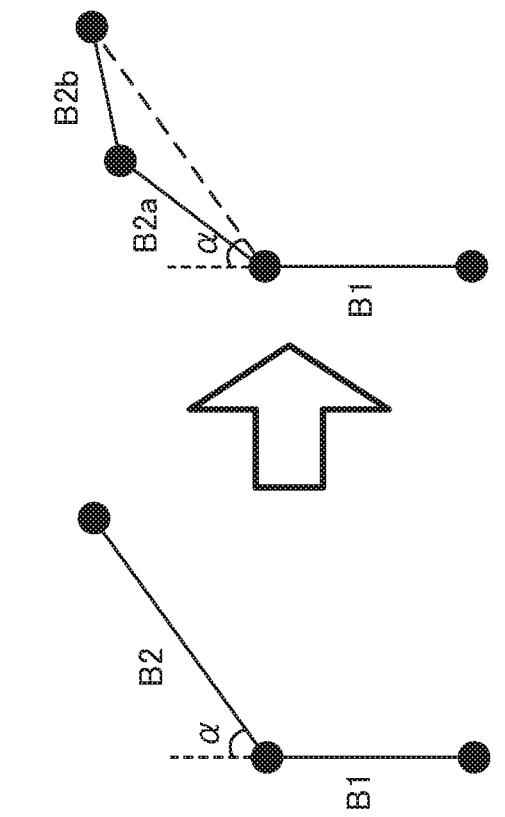
FIGS. 14A and 14B illustrate another exemplary balance adjustment in a case where the skeleton of the CG model is different from the skeleton of the robot.
Figure 14B:
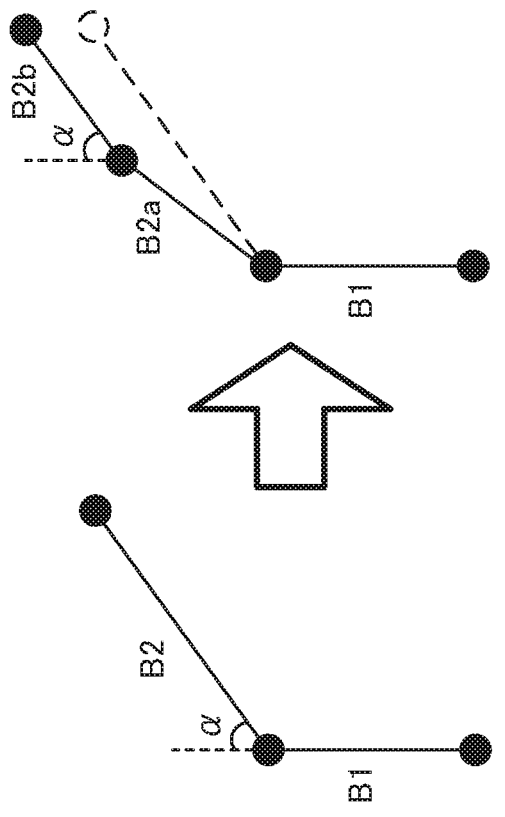

FIGS. 14A and 14B illustrate another exemplary balance adjustment in a case where the skeleton of a CG model is different from the skeleton of a robot. FIGS. 14A and 14B illustrate the above-mentioned methods (1) and (2) when the number of bones increases, respectively. As understood from FIGS. 14A and 14B, the skeleton corresponding to a bone B2 of the CG model is increased by a combination of bones B2a and B2b of the robot. The bone B1 is a specific bone neighboring the proximal bone (i.e., bone B2a) of the plurality of increased bones (i.e., bones B2a and B2b).

FIGS. 14A and 14B and FIGS. 15 to 17 are plan views (e.g., x-y plane views) of robot bones seen from a predetermined viewpoint.

In FIG. 14A, according to the method (1), the relative angle of the bone B2b to the bone B1 is set to be identical to a (the angle of a bone existing in the CG model) so that the same angle can be maintained between the original data (CG model) and the robot. As a result, the relative angle of the bone B2b in an increased bone range (i.e., the distal bone of the plurality of increased bones) to the bone B1 can be maintained, although the coordinates of a distal joint point of the bone B2b may not coincide with the coordinates of a distal joint point of the bone B2 of the CG model before and after the increase in the number of bones.

In FIG. 14B, according to the method (2), the position of the distal joint point of the bone B2b (i.e., the distal end position of the plurality of increased bones) is set to be identical to the position of the distal joint point of the bone B2 of the CG model (i.e., the distal end position of a bone existing in the CG model). As a result, the influence of the adjustment in the increased bone range on other bones can be appropriately suppressed.

Alternatively, the above-mentioned methods may be employed to correct the coordinates (angle, position, etc.) of a bone neighboring the increased bone. For example, the adjustment can be performed in such a manner that a neighboring bone in the CG model and a neighboring bone in the robot coincide with each other in the position or the angle.

According to the above-mentioned embodiment, even when the skeleton structure of a robot does not coincide with the skeleton structure of a CG model specified by choreography data, the bone adjustment can be appropriately performed. Therefore, the motion of a CG model having been once created can be widely applied to robots.

Limitation with Respect to Joint Angle

Unlike the CG model, the robot has limitation with respect to the operation angle of each joint, which may be referred to as limit angle. The inventors have found that when there are definitions (settings) relating to limit angles of respective joint portions (and/or bones) it is important to prevent the angle from being forcibly changed in response to a request based on choreography data (for example, an instruction to move the predetermined bone beyond its limit angle), so that it is natural for a person on the viewing side.

In this embodiment, the data relating to angles (joint angles) of respective bones are held after the above-mentioned bone adjustment has been completed. On the other hand, there will be a case where the angular limitation is not yet applied. The angular limitation may be applied before the bone adjustment is performed. When the requested angle is an unfeasible one, the following two methods are employable to limit an angle:

(1) ignoring the requested angle if it exceeds a predetermined angle (e.g., limit angle), (that is setting the bone angle to the predetermined angle); and
(2) setting the bone angle to the limit angle, and substituting the parent bone if there is an insufficiency in the angle (a difference between the designated angle and the limit angle).

It should be noted that regardless of the pattern the determination with respect to prioritization between the final angle and the position may vary depending on each bone.

Figure 15A:
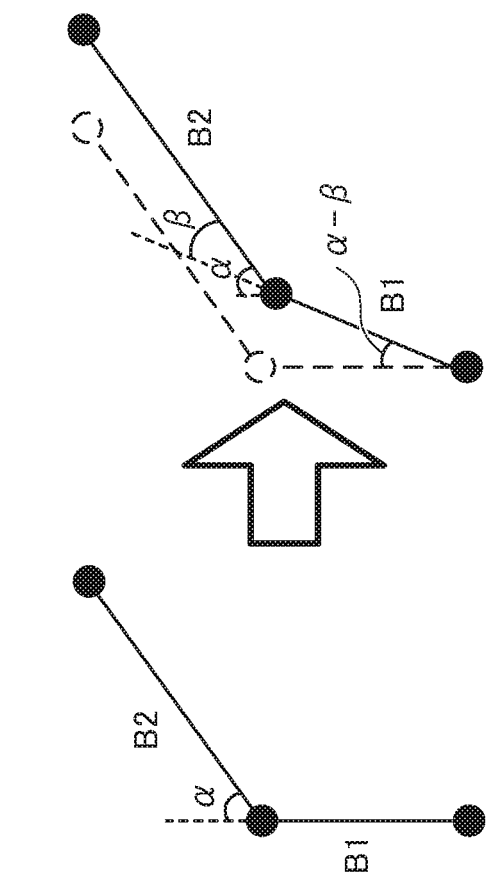
FIGS. 15A and 15B illustrate exemplary limitation with respect to joint angle according to an embodiment of the present invention.
Figure 15B:
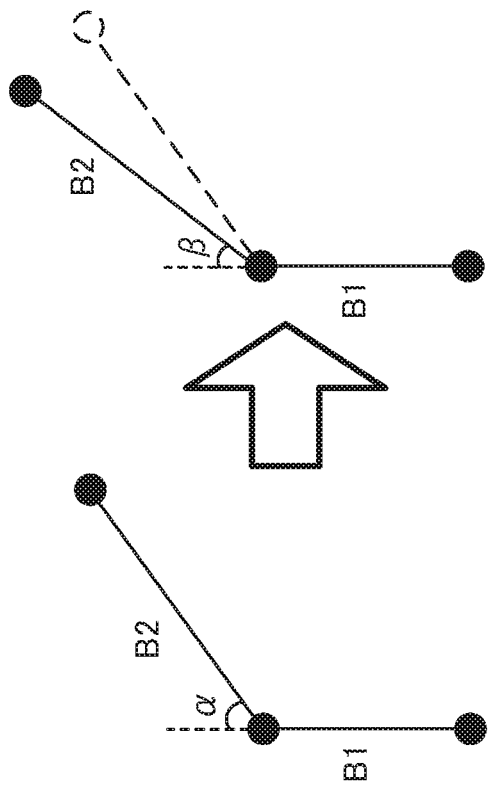

FIGS. 15A and 15B illustrate exemplary limitation with respect to the joint angle according to an embodiment of the present invention. FIGS. 15A and 15B illustrate exemplary joint angle limitation according to the above-mentioned methods (1) and (2), respectively. FIGS. 15A and 15B show, the CG model and the bones B1 and B2 of the robot. According to the examples illustrated in FIGS. 15A and 15B, the limit angle of the bone B2 is $\beta$ and the choreography data specifies $\alpha$ ($\alpha > \beta$) as the angle of the bone B2.

In FIG. 15A, since any angle exceeding the predetermined angle (limit angle $\beta$) is regarded as the predetermined angle according to the method (1), the bone B2 of the robot is inclined by the angle $\beta$. The predetermined angle is not limited to the limit angle and may be any other angle smaller than the limit angle.

In FIG. 15B, the robot recognizes that the angle $\alpha$ designated for the bone B2 exceeds the limit angle $\beta$ according to the method (2). Therefore, the robot first corrects the angle of the bone B2 to the limit angle $\beta$, and then sets the angle of the bone B1, which is the parent of the bone B2, to $\alpha$-$\beta$ corresponding to the insufficiency in the inclination. As mentioned above, setting the angle ($\alpha$) exceeding the limit angle being set for the bone B2 to be equal to a sum of the angle ($\beta$) of the bone B2 and the angle ($\alpha$-$\beta$) of the bone B1, which is the parent of the bone B2, can prevent the angle of each bone from exceeding the limit angle while maintaining the angle of the final bone.

In the example illustrated in FIG. 15B, it is presumed that the angle ($\alpha$-$\beta$) does not exceed a limit angle (e.g., $\gamma$) of the bone B1. However, if the angle ($\alpha$-$\beta$) exceeds the limit angle, the angle of a parent bone of the bone B1 may be set to $\alpha$-$\beta$-$\gamma$, which corresponds to the insufficiency in the inclination between the bones B1 and B2. In this manner, insufficiency in the inclination may be propagated to the parent.

Limitation with Respect to Speed

Unlike the CG model, the robot has limitations with respect to the speed at which each bone can shift, which may be referred to as limit speed. The inventors have found that when there are definitions (settings) relating to limit speeds of respective joint portions (and/or bones) it is important to reduce the speed (or limit the speed) while holding the shape (stream) of the motion if the requested speed specified by choreography data is an unfeasible one (more specifically, if a predetermined bone cannot reach the next designated coordinates until the next designated time (e.g., the next beat) even when it is shifted at the limit speed).

The inventors have conducted inventive studies, in particular, on cases where choreography data can indicate dance movements. Then, the inventors have focused on the fact that although the dance seems to be a series of actions of downbeats at first glance, simply connecting poses at downbeats does not seem like dancing and have conceived that sharp motions like dance can be expressed by emphasizing poses of upbeats (i.e., each relaxed state preceding the next action). Note that the upbeat corresponds to a latter part of the beat in the choreography data.

Here, it is now assumed that the above-mentioned bone adjustment has been completed, the angle data of respective bones are held, and the angle of each joint is not greater than its limit angle. It is further assumed that the speed requested in this state is unfeasible (i.e., the requested speed is greater than the limit speed). In this case, applying the speed limitation before performing the bone adjustment or the angular limitation may be desirable. When the requested speed is unfeasible, the following two methods are employable as practical speed limitation method:

(1) performing bone shifting within a feasible range (the range not exceeding the limit speed); and
(2) performing bone shifting in such a way as to prioritize each upbeat (so that the pose of the upbeat can be reproduced).

FIGS. 16A and 16B illustrate an exemplary limitation with respect to speed according to an embodiment of the present invention. FIGS. 16A and 16B illustrate a movement of original data (CG model) at each beat and a robot movement at each beat as a result of the speed limitation according to the above-mentioned method (1) applied to the original data, respectively. As illustrated in FIGS. 16A and 16B, the bone B2 repeats clockwise and counterclockwise rotations in relation to the bone B1. In addition, it is assumed that the pose at an upbeat 600 in FIG. 16A coincides with that in FIG. 16B.

FIG. 16A corresponds to a case where the limit speed is not particularly defined. When the limit speed is not defined, the bone can surely shift and reach a target position regardless of the distance for transition.

In FIG. 16B, since the speed of the bone B2 is limited, transition from the angle of the upbeat 600 to the angle of a downbeat 500 cannot be completed during the time of a half beat. Therefore, before completing the counterclockwise rotation of the bone B2 at the limit speed, the robot starts the next transition (clockwise rotation) at the time of the downbeat 500. The remaining transition angle not completed is ignored (more specifically, the bone B2 does not shift to the intended destination (see the downbeat 500 in FIG. 16A)).

In addition, because of the limit speed, it is unfeasible to complete the transition from the angle of the downbeat 500 to the angle of an upbeat 601 during the time of a half beat in FIG. 16B. Therefore, the robot starts the next transition (counterclockwise rotation) at the time of the upbeat 601 before completing the clockwise rotation of the bone B2 at the limit speed.

As mentioned above, according to the method (1), if the transition of the bone is incomplete, the beat defined by the choreography data can be maintained by stopping the transition on the way.

FIGS. 17A and 17B illustrate another exemplary limitation with respect to speed according to an embodiment of the present invention. FIGS. 17A and 17B illustrate a movement of original data (CG model) at each beat and a robot movement at each beat as a result of the speed limitation according to the above-mentioned method (2) applied to the original data, respectively. Other environments are similar to those in FIGS. 16A and 16B. For example, FIG. 17A is identical to FIG. 16A.

In FIG. 17B, since the speed of the bone B2 is limited, transition from the angle of the upbeat 600 to the angle of the downbeat 500 cannot be completed during the time of a half beat. Therefore, the robot pre-reads time series of choreography data and refers to the next upbeat (the upbeat 601), and then determines the coordinates (angle and/or position) of the bone B2 at the downbeat 500 so that the transition to the angle (and/or position) of the next upbeat can be surely performed. Subsequently, the robot moves the bone B2 from the angle of the upbeat 600 to the determined angle of the downbeat 500.

The robot starts the next transition (clockwise rotation) at the time of the downbeat 500. Since the angle of the downbeat 500 is already adjusted so that the transition to the angle of the upbeat 601 can be surely completed, the robot rotates the bone B2 clockwise at a speed not exceeding the limit speed until its angle becomes identical to that of the original data at the upbeat 601.

As mentioned above, according to the method (2), pre-reading the choreography data can reproduce the pose of each upbeat and can realize sharp movements.

In the method (2), it is desired to hold the poses of respective downbeats as much as possible. To maintain the poses of upbeats, the pose of each downbeat may be adjusted to be completely different compared to the original data.

In addition, according to the method (2), when holding the poses of some upbeats is difficult, not only the poses of downbeats but also the poses of upbeats may be adjusted so that the poses of upbeats can be held as much as possible and/or so that the poses of important upbeats can be held. More specifically, the choreography data and/or the motion of each bone may be modified so that the coordinates of at least a part of timings corresponding to the upbeats can be preferentially maintained.

To prevent the robot from moving unnaturally, the inventors have enthusiastically studied important beats having choreography data (including choreography data to which the above-mentioned bone adjustment and angle limitation have been applied) whose original movements should be surely reproduced. When creating choreography data, it is conceivable to employ a method for combining a series of motions composed of a predetermined number of beats (e.g., two beats, four beats, eight beats, etc.). For example, connecting choreographies defined by 8-beat units (One-Eight) or 32 (=8 beats×4)-beat units (Four-Eight) may create choreography data representing a dance movement. Such a series of motions may be referred to as "move", for example.

The inventors have focused that when the above-mentioned method is employed to create choreography data it is important to match the movement before and after a connecting point (matching point) between one move and another move and smoothen the transition of each movement, and have conceived applying angle and/or speed limitations so that the pose of an upbeat immediate preceding the connecting point, i.e., the final upbeat of the move, can be held.

FIGS. 18A and 18B illustrate another exemplary limitation with respect to speed according to an embodiment of the present invention. FIGS. 18A and 18B illustrate a movement of original data (CG model) at each beat and a robot movement at each beat as a result of the speed limitation according to the above-mentioned method (2) applied to the original data, respectively. As illustrated in FIGS. 18A and 18B, the bone B1 (corresponding to an upper arm) and the bone B2 (corresponding to a forearm) cooperatively make a series of movements (moves), when the CG model or the robot is seen from the top. In addition, it is assumed that the pose at the upbeat 600 in FIG. 18A coincides with that in FIG. 18B.

In FIG. 18B, not only the poses of the downbeats 500 and 501 but also the pose of the upbeat 601 are adjusted so that the pose of an upbeat 602 (i.e., the final upbeat) of the move can be held and so that the pose of the upbeat 601 can be held as much as possible. The path of each bone can be calculated based on the final position of the distal end (i.e., the joint point far from the root) of each bone. Exemplary bone path calculation will be described in detail with reference to FIG. 19.

Figure 19:
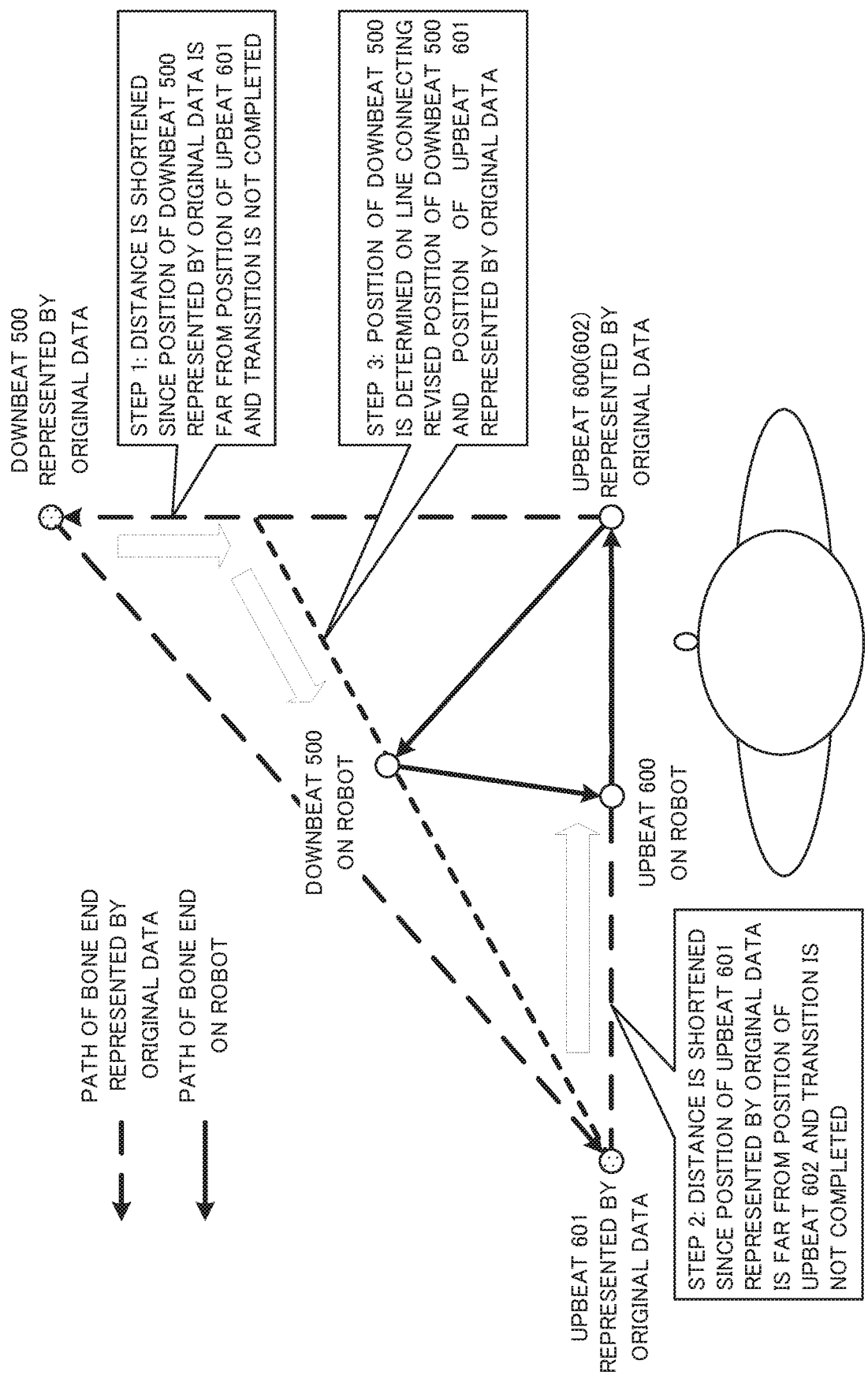
FIG. 19 illustrates an exemplary bone path calculation in the limitation of speed according to an embodiment of the present invention.

FIG. 19 illustrates an exemplary bone path calculation in the limitation of speed according to an embodiment of the present invention. Hereinafter, exemplary path calculation for the end of the bone B2 illustrated in FIGS. 18A and 18B will be described in FIG. 19, although similar path calculation can be applied to another bone.

First, in step 0 (although not illustrated), the robot confirms reachability within a limited time with respect to transition from the position of each upbeat of the original data to the position of the following downbeat. In the illustrated example, the robot determines whether it is possible to reach the position of the downbeat 500 from the position of the upbeat 600 of the original data within the time of a half beat. In the illustrated example, it is assumed that the reachability has been confirmed. However, if the reachability cannot be confirmed, the position of the downbeat 500 may be brought closer to the position of the upbeat 600 in such a way to assure reachability.

Next, in step 1, the robot confirms reachability within a time with respect to transition from the position of each downbeat of the original data to the position of the following upbeat. In the illustrated example, the robot determines whether it is possible to reach the position of the upbeat 601 of the original data from the position of the downbeat 500 in step 0 within the time of a half beat. In the illustrated example, it is assumed that the reachability cannot be confirmed. Therefore, the robot brings the position of the downbeat 500 closer to the position of the upbeat 601. In the above-mentioned positional adjustment, it is desired that the change in movement from the position of the upbeat 600 of the original data to the position of the downbeat 500 can be reduced as much as possible (for example, so as to change a value of only one coordinate axis (e.g., back-and-force direction of the robot)).

Next, in step 2, the robot confirms reachability with respect to the positions between the upbeats. In the illustrated example, the robot determines the reachability within the time of one beat with respect to transition between the upbeats 601 and 600 of the original data as well as transition between the upbeats 601 and 602. In the illustrated example, it is assumed that reaching from the position of the upbeat 601 of the original data to the position of the upbeat 602 of the original data is unfeasible. Therefore, the robot brings the position of the upbeat 601 closer to the position of the upbeat 602.

Next, in step 3, the robot readjusts the position of the downbeat adjusted in step 1, considering the position of the upbeat adjusted in step 2. In this case, it is desired that the readjustment is performed in such a way as to prevent the robot movement from becoming unnatural while maintaining the reachability from the position of the downbeat to the position of the upbeat. For example, in the illustrated example, the position of the downbeat 500 on a line connecting the position of the downbeat 500 amended in step 1 and the position of the upbeat 601 of the original data is determined.

The above-mentioned bone path calculation can realize sharp movements under the restriction by the limit speed.

The above-mentioned processing in steps 0 to 3 of FIG. 19 may not be performed in the above-mentioned order. In addition, the processing in steps 0 to 3 may be performed repetitively. In addition, collectively performing the downbeat/upbeat adjustment relating to the speed limitation based on all beats of the entire choreography data is desired. If a real-time processing is requested, the adjustment may be performed only for beats adjacent to the presently operating beat. Further, the path calculation is not limited to the above-mentioned processing of steps 0 to 3.

In addition, although in FIG. 19, the speed is adjusted so as to surely hold the pose of the final upbeat of the move, the timing to assure the pose reproducibility (for example, the coordinates and the angle or the like of each bone coincide with values indicated by the choreography data) is not limited to timing of the final upbeat of the move. For example, the timing to assure the pose reproducibility may be the timing of another upbeat, a downbeat, or a predetermined specific beat.

In addition, a priority level for assuring the pose reproducibility may be set to a predetermined timing. In this case, for example, it is desired to set a higher priority level for the final upbeat of the move compared to priority levels allocated to other beats. The priority level of each timing (beat) may be notified to the robot by using a note-on/off signal or other event (MIDI event, SysEx event, etc.) corresponding to this beat in the choreography data.

In addition, defining the beat whose pose is to be forcibly matched with the choreography data (i.e., no adjustment is to be performed) at predetermined timing (e.g., periodic timing) may by desired. For example, the beat whose pose is to be forcibly matched with the choreography data may be notified to the robot by using a note-on/off signal or other event (MIDI event, SysEx event, etc.) corresponds to this beat in the choreography data.

In addition, at predetermined timing, information (reset information) indicating resetting each bone to a predetermined state (e.g., initial state) may be notified to the robot by using a similar signal and/or event. In this case, in response to detection of the reset information included in the choreography data, for example, the robot may control each bone to return to its initial state before a predetermined time (e.g., one beat) elapses since the detected timing. Forcibly prohibiting the pose adjustment or resetting the pose as mentioned above can restore the original normal pose even when an unnatural pose occurs temporarily due to accumulation of pose adjustments.

Information (control information) indicating the above-mentioned balance adjustment and/or limitation-related control method may be notified to the robot by using a note-on/off signal or other event (MIDI event, SysEx event, etc.) included in the choreography data. Further, based on information included in the choreography data, the robot may change the method for adjustment, such as balance adjustment, angle/speed limitation, or the like, during its operation. Thus, performing appropriate adjustment according to operation contents of the robot becomes feasible.

For example, in cases where the choreography data indicates a change motion from an ordinary motion (walking or the like) to an intense motion (dance or the like), the control information may be included in the choreography data so that the above-mentioned speed limitation method (1) can be applied during walking and the above-mentioned speed limitation method (2) can be applied during dancing. Thus, the robot can be controlled dynamically in such a manner that the upbeats are emphasized when dancing.

The generation unit 16 illustrated in FIG. 3 may perform the above-mentioned balance adjustment, angle/speed limitation related adjustment, and the like at the same time when any choreography data for the robot 10 is generated from choreography data for the CG model. In addition, the reproduction unit 13 illustrated in FIG. 3 may perform the above-mentioned adjustments in the conversion of the time-series information about the coordinates of respective constituent components performed in step S22 of FIG. 10.

The application of each embodiment described above is not limited to cases where motion data of a CG model is used for a robot. For example, the above-mentioned balance adjustment, angle/speed limitation, and the like may be performed when choreography data created as motion data for a certain CG model is used as motion data for another CG model. Such controls may be realized in consideration of differences in skeleton structure between CG models, initial state of hierarchical structure, reference posture, length of each bone, movable range of each joint, and the like. In addition, the parameters to be considered in these controls may be included in the choreography data.

In addition, terms described in the present specification and/or terms necessary in understanding the present specification may be replaced with any other terms having the same or similar meanings. In addition, information, parameters, and the like described in the present specification may be represented by absolute values, or relative values with respect to a predetermined value, or may be represented by another related information.

The information, signals, and the like described in the present specification may be expressed by using any of a variety of different technologies. For example, data, instructions, commands, information, signals, bits, symbols, chips, and the like that may be mentioned throughout the specification may be represented by voltage, current, electromagnetic wave, magnetic field or particle, optical field or photon, or arbitrary combination thereof.

Each aspect/embodiment described in the present specification may be carried out alone or in combination, or may be switched in accordance with actual implementation. In addition, the notification of predetermined information (e.g., notification of "being X") may be performed explicitly or implicitly (for example, by not notifying the predetermined information).

As long as there is no contradiction, the order in processing, sequence, flowchart, or the like in each aspect/embodiment described in the present specification may be modified. For example, the methods described in the present specification include various contents of steps presented according to an exemplary order, although the order is not limited to the presented specific one.

Although the present invention has been described in detail, it will be obvious to those skilled in the art that the present invention is not limited to the embodiments described in the present specification. The present invention can be implemented as a modified or changed aspect without departing from the spirit and scope of the present invention defined by the appended claims. Accordingly, the description of the present specification is for the purpose of illustration and does not have any restrictive meaning to the present invention.

What is claimed is:

1. A data conversion apparatus comprising:
an acquisition unit configured to acquire first time-series information for designating coordinates of a constituent component of a predetermined computer graphics (CG) model on a beat basis in time series;
a control unit configured to detect a structural difference between the predetermined CG model and a predetermined robot based on the first time-series information; and
a generation unit configured to correct the first time-series information based on the detected difference to generate second time-series information for designating coordinates of a constituent component of the predetermined robot on a beat basis in time series.

2. The data conversion apparatus according to claim 1, wherein a data structure conforming to Standard MIDI File (SMF) format includes the first time-series information.

3. The data conversion apparatus according to claim 2, wherein a channel of the SMF format corresponds to one or more first time-series information.

4. The data conversion apparatus according to claim 2, wherein note number and velocity of a note-on signal in the SMF format are used as information about the coordinates of a constituent component of the CG model.

5. The data conversion apparatus according to claim 2, wherein delta time in the SMF format is used as information relating to a length of a beat at which the coordinates of a constituent component of the CG model changes.

6. The data conversion apparatus according to claim 1, wherein a skeleton including two joint points and a bone connecting the joint points constitutes the predetermined CG model.

7. The data conversion apparatus according to claim 6, wherein the first time-series information includes information about a relative angle of the bone of the CG model.

8. The data conversion apparatus according to claim 6, wherein the first time-series information includes information about a relative distance from an initial position of the CG model and/or information about a rotation angle from a reference point of the CG model.

9. The data conversion apparatus according to claim 6, wherein the generation unit generates, based on the first time-series information about a bone not existing in the predetermined robot but existing in the predetermined CG model, the second time-series information about a bone neighboring the bone and existing in the predetermined robot.

10. The data conversion apparatus according to claim 6, wherein the generation unit ignores the first time-series information about a bone not existing in the predetermined robot but existing in the predetermined CG model.

11. The data conversion apparatus according to claim 6, wherein, when expressing a bone existing in the predetermined CG model by a plurality of bones existing in the predetermined robot, the generation unit generates the second time-series information about the plurality of bones in such a manner that an angle between a bone neighboring a bone positioned at one end of the plurality of bones and a bone positioned at the other end of the plurality of bones becomes equal to an angle of the bone existing in the predetermined CG model.

12. The data conversion apparatus according to claim 6, wherein, when expressing a bone existing in the predetermined CG model by a plurality of bones existing in the predetermined robot, the generation unit generates the second time-series information about the plurality of bones in such a manner that a position of an end of the plurality of bones coincides with a position of an end of the bone existing in the predetermined CG model.

13. The data conversion apparatus according to claim 6, wherein, when a limit angle is defined for a bone existing in the predetermined robot, the generation unit generates the second time-series information in such a way as to regard an angle exceeding the limit angle in the first time-series information as the limit angle.

14. The data conversion apparatus according to claim 6, wherein, when a limit angle is defined for a bone existing in the predetermined robot, the generation unit generates the second time-series information in such a way as to equalize an angle exceeding the limit angle in the first time-series information with a sum of the angle of the bone and the angle of a parent bone of the bone.

15. The data conversion apparatus according to claim 6, wherein, when a limit speed is defined for a bone existing in the predetermined robot, the generation unit generates the second time-series information so as not to exceed the limit speed.

16. The data conversion apparatus according to claim 6, wherein, when a limit speed is defined for a bone existing in the predetermined robot, the generation unit generates the second time-series information in such a manner that coordinates of at least a part of timing corresponding to an upbeat in the first time-series information can be preferentially maintained.

17. A robot having a plurality of joint portions, comprising:
    an acquisition unit configured to acquire first time-series information for designating coordinates of a constituent component of a predetermined computer graphics (CG) model on a beat basis in time series;
    a control unit configured to detect a structural difference between the predetermined CG model and the robot based on the first time-series information;
    a generation unit configured to correct the first time-series information based on the detected difference to generate second time-series information for designating coordinates of a constituent component of the robot on a beat basis in time series;
    a reproduction unit configured to generate a control signal for controlling motions of the plurality of joint portions based on the second time-series information; and
    a driving unit configured to drive the plurality of joint portions based on the control signal.

18. A non-transitory computer-readable storage medium configured to store a program that causes a computer to perform operations, the operations comprising:
    acquiring first time-series information for designating coordinates of a constituent component of a predetermined computer graphics (CG) model on a beat basis in time series;
    detecting a structural difference between the predetermined CG model and a predetermined robot based on the first time-series information; and
    correcting the first time-series information based on the detected difference to generate second time-series information for designating coordinates of a constituent component of the predetermined robot on a beat basis in time series.

19. An information processing method, comprising steps of:
    acquiring first time-series information for designating coordinates of a constituent component of a predetermined computer graphics (CG) model on a beat basis in time series;
    detecting a structural difference between the predetermined CG model and a predetermined robot based on the first time-series information; and
    correcting the first time-series information based on the detected difference to generate second time-series information for designating coordinates of a constituent component of the predetermined robot on a beat basis in time series.

* * * * *